(12) United States Patent
Nordmeyer et al.

(10) Patent No.: US 7,621,538 B2
(45) Date of Patent: Nov. 24, 2009

(54) AIR SPRING ASSEMBLY WITH LOCALIZED SIGNAL PROCESSING, SYSTEM AND METHOD UTILIZING SAME, AS WELL AS OPERATING MODULE THEREFOR

(75) Inventors: Daniel L. Nordmeyer, Indianapolis, IN (US); Graham R. Brookes, Carmel, IN (US)

(73) Assignee: BFS Diversified Products, LLC

( * ) Notice: Subject to any disclaimer, the term of this patent is extended or adjusted under 35 U.S.C. 154(b) by 537 days.

(21) Appl. No.: 11/442,210

(22) Filed: May 26, 2006

(65) Prior Publication Data

US 2006/0267297 A1 Nov. 30, 2006

Related U.S. Application Data

(60) Provisional application No. 60/685,689, filed on May 28, 2005.

(51) Int. Cl.
*B60G 17/018* (2006.01)
*B60G 17/02* (2006.01)

(52) U.S. Cl. .............. 280/5.515; 280/5.507; 280/5.512; 280/5.514; 280/6.151; 280/6.154; 280/6.157; 280/6.159; 267/64.16; 701/37; 701/38; 701/40

(58) Field of Classification Search ................. 280/5.5, 280/5.507, 5.512, 5.514, 5.515, 6.151, 6.154, 280/6.157, 6.159; 701/37, 38, 40; 267/64.16, 267/64.27

See application file for complete search history.

(56) References Cited

U.S. PATENT DOCUMENTS

| | | | |
|---|---|---|---|
| 4,310,172 A | 1/1982 | Claude et al. | |
| 4,386,791 A | 6/1983 | Watanabe | |
| 4,634,142 A * | 1/1987 | Woods et al. | ............ 280/5.503 |
| 4,798,369 A | 1/1989 | Geno et al. | |
| 5,141,246 A * | 8/1992 | Nakaniwa | .................... 280/5.5 |
| 5,167,289 A | 12/1992 | Stevenson | |
| 5,220,505 A * | 6/1993 | Yokote et al. | ................. 701/37 |
| 5,301,111 A | 4/1994 | Utsui et al. | |
| 5,337,137 A | 8/1994 | Ogawa et al. | |
| 5,350,983 A | 9/1994 | Miller et al. | |
| 5,521,497 A | 5/1996 | Schneider et al. | |
| 5,653,315 A | 8/1997 | Ekquist et al. | |
| 5,740,039 A * | 4/1998 | Hirahara et al. | ............... 701/37 |
| 5,859,692 A | 1/1999 | Ross, Jr. et al. | |
| 5,936,161 A | 8/1999 | Fischer | |
| 6,032,535 A | 3/2000 | Fischer et al. | |
| 6,036,179 A | 3/2000 | Rensel | |
| 6,637,269 B2 | 10/2003 | Reck et al. | |
| 6,698,730 B2 | 3/2004 | Easter | |
| 7,267,331 B2 * | 9/2007 | Holbrook et al. | ......... 267/64.28 |
| 2002/0035423 A1 * | 3/2002 | Shank et al. | .................. 701/37 |
| 2003/0001346 A1 * | 1/2003 | Hamilton et al. | ......... 280/5.515 |
| 2004/0245687 A1 | 12/2004 | Sendrea et al. | |
| 2005/0077691 A1 * | 4/2005 | Witters | .................... 280/5.514 |

(Continued)

FOREIGN PATENT DOCUMENTS

EP 0 678 727 A 10/1995

(Continued)

*Primary Examiner*—Ruth Ilan
*Assistant Examiner*—James English
(74) *Attorney, Agent, or Firm*—Sarah M. Jabbari; Matthew Dugan

(57) ABSTRACT

An operating module for localized signal processing at a corner of a vehicle includes a housing, a valve assembly or a sensor, and a signal processing device. The operating module can be used in operative association with an air spring assembly. The operating module can be in communication with other components and/or systems. A vehicle suspension system and method are also discussed.

23 Claims, 20 Drawing Sheets

U.S. PATENT DOCUMENTS

| | | | |
|---|---|---|---|
| 2005/0093265 A1* | 5/2005 | Niaura et al. | 280/124.16 |
| 2005/0161891 A1* | 7/2005 | Trudeau et al. | 280/5.507 |
| 2008/0048405 A1* | 2/2008 | DeLorenzis et al. | 280/6.159 |

FOREIGN PATENT DOCUMENTS

| | | |
|---|---|---|
| EP | 0 828 087 A | 3/1998 |
| EP | 0 924 115 A | 6/1999 |
| EP | 0 828 087 B1 | 12/1999 |
| WO | WO89/12766 | 12/1989 |
| WO | WO 2005/032863 | 4/2005 |

\* cited by examiner

AIR SPRING ASSEMBLY WITH LOCALIZED SIGNAL PROCESSING, SYSTEM AND METHOD UTILIZING SAME, AS WELL AS OPERATING MODULE THEREFOR

This application claims priority from U.S. Provisional Patent Application No. 60/685,689 filed on May 28, 2005, which is hereby incorporated herein by reference in its entirety.

BACKGROUND

The present novel concept broadly relates to the art of vehicle suspension systems and, more particularly, to an air spring assembly including an air spring, a sensor outputting a sensor signal, a valve operative to control fluid communication with the air spring, and a signal processing device communicating signals between the sensor and/or valve and a supervisory control unit. The present novel concept also relates to an operating module adapted for use in association with an air spring and including a sensor, a valve and a signal processing device. The present novel concept further includes a system and method utilizing such an air spring assembly and/or operating module.

Terms such as "process," "processing" and "processor" are used herein in various forms and combinations to refer to conversion, translation, encryption, decryption, encoding, decoding and other actions or manipulations of signals, data, commands, instructions and/or communications, as well as components adapted to perform the same. As an example, an analog-to-digital processor may be used to convert an analog signal into a digital signal. As another example, a signal processing device may be used to encode or otherwise combine and/or convert a plurality of signals, such as digital sensor signals, for example, into a form suitable for communication on a vehicle or local network. Additionally, these terms are used herein to refer to the performance or execution of commands and/or instructions, such as those that might be received from a decision-making or supervisory device or system. For example, a signal processing device may be used to receive a command or instruction from another component or system, such as from along a vehicle or system network, for example, and perform, execute, or cause to be executed, that command or instruction, such as receiving an instruction to open a valve and energizing or otherwise signaling a component to energize the valve actuator, for example.

Terms such as "control" and "controller" are used herein in various forms and combinations to refer to actions or components for performing actions that involve evaluating or comparing inputs, signals, data and/or communications and making decisions or determinations regarding the actions based upon predefined criteria. For example, a supervisory control unit may receive height data from a plurality of height sensors and make one or more determinations and/or decisions based upon this height data, such as determining that the vehicle is not level, for example, deciding that a leveling action should be initiated and then issuing appropriate instructions to cause the corresponding suspension components to perform an action. A "processor" or "processing device," as discussed above, might then receive the issued instruction and execute, perform or cause the instructed action to be performed.

As vehicle manufacturers strive to develop vehicles providing greater ride comfort as well as improved vehicle performance at these comfort levels, the various major mechanical systems of such vehicles have become increasingly electronically controlled and are now often quite complex. Such major mechanical systems can include suspensions systems having active damping and/or active roll control, braking systems that provide anti-lock braking and traction control, and stability control systems that often include aspects of one or more of the foregoing as well as other systems. Recently, even the headlights of a vehicle have become equipped with actively adjustable mounting systems. For example, some high-intensity lamp systems are operative to keep the lamp beams properly directed along the roadway as the vehicle body sways and tilts, such as under turning, braking or accelerating actions.

As the foregoing and other vehicle systems have become increasingly complex, a number of problems and/or difficulties have developed. One example of such a problem involves the attendant increase in the number of sensors and other components, as well as the corresponding increase in wires and/or connectors needed to communicate information and data to and from these devices. Direct or "hard" wiring such a multitude of sensors exacerbates or otherwise undesirably influences the existing challenges already associated with assembly and/or installation. Additionally, this can lead to an increase in cost and/or in vehicle weight.

Another example of such a problem involves the inevitable increases in computing/processing capacity that accompanies the increased usage of electronic components and systems. More specifically, the general need for increased processing power tends to lead to the use of microprocessors and attendant components in the systems that are greater in number, greater in size and processing power, or in many cases greater in both number and size. This, in and of itself, does not normally present an issue. Often, however, components for such systems are often housed within a common structure that is then mounted on the vehicle.

One such structure is often referred to as a body control module (BCM), which typically houses a collection of supervisory control units that have electronic components related to systems effecting body control (e.g., vehicle height control and active leveling). Typically, available physical space is at a premium on a vehicle and great efforts are also often made to avoid weight increases. Thus, it is increasingly difficult to fit larger and/or a greater number of processors and other components on or around the vehicle or within a housing, such as a BCM, without increasing the size of the same, which is undesirable. Furthermore, the corresponding weight increase from the additional materials used would likely be met with considerable resistance. Thus, the density of the electronic components fitted into this constrained physical space can increase the difficulty of assembly, and may even create corresponding increases in assembly costs.

Another problem associated with the use of increased processing power is the increased quantity of heat that is generated by the processors and components. This is particularly problematic where processors and components of various kinds and types are densely packaged within limited space. It is well understood that electronic components are generally adversely affected by operating at increased temperatures. Thus, continued operation in such an environment is disadvantageous. Additionally, increases in mass and/or surface area are often utilized to dissipate the additional heat load caused by the processors and components. As weight and physical space constraints are commonly present on vehicles, however, these options are often less acceptable.

In light of these and other problems and difficulties, vehicle suspension components and systems have been proposed that attempt to distribute electronic controllers or other decision making components to other parts of the vehicle to reduce space usage and heat loads, or to at least to help offset the trends discussed above regarding the same. One example of these kinds of components and systems is disclosed in International Publication No. WO 2005/032863 (the '863 publication). However, the components and system disclosed in the '863 publication suffer from certain deficiencies that may reduce the utility and application of the same.

More specifically, the components and system disclosed in the '863 publication have decentralized control (i.e., logic and decision making) of the vehicle suspension system. That is, each air suspension unit independently controls its operation and performance (e.g., height and damping rate adjustment) at its respective corner of the vehicle. The system does not appear to disclose any type of whole-vehicle electronic control unit (e.g., master or supervisory controller), such as might be located in a BCM, for example. Thus, there is no single component that receives and evaluates signals regarding overall vehicle performance and operation, and that is responsible for coordinating and directing the operation of the suspension components.

The air suspension units in the '863 publication are indicated as being in communication with one another. However, all decisions regarding performance and operation of an air suspension unit are believed to be independently made at each corner by the electronic controller at that corner. As a result, four different and independent logic processes, one at each corner, are being performed on the vehicle at any given time. Thus, it is believed that such a non-coordinated control scheme may result in suspension components reacting to changes induced or otherwise caused by the actions at other corners of the vehicle, rather than occurring primarily in response to road and/or performance inputs. Therefore, it is believed that significant difficulties with regard to performance and operation may develop due to the lack of a centralized or vehicle-centric control unit (e.g., a global chassis controller). For example, it seems possible that one front corner could be taking an action while the other front corner is taking a different action. These two actions might offset one another resulting in an unaddressed vehicle condition or cause some other undesirable result. As such, it is believed that the components and system disclosed in the '863 publication do not adequately address the foregoing problems and difficulties in present in known vehicles and vehicle suspension systems.

BRIEF DESCRIPTION

An operating module in accordance with the present novel concept for use on an associated air spring at an associated corner of an associated vehicle having an associated suspension controller, the associated air spring undergoing a first associated input condition and including an associated end member having an associated opening therethrough, is provided and includes a housing including a fluid passage extending therethrough. The housing being adapted for securement on the associated end member, such that the fluid passage is in communication with the associated opening. At least one of a valve assembly or a first sensor is supported on the housing. The valve assembly, if provided, is supported along the fluid passage and is selectively operable between an open passage condition and a closed passage condition. The first sensor, if provided, outputs a signal indicative of the first associated input condition. A processing device is supported on the housing and is in electrical communication with the associated suspension controller and at least one of the valve assembly or the sensor.

An operating module in accordance with the present novel concept for use on an associated air spring undergoing a first associated input condition and having an associated end member is provided and includes a housing including a housing wall and a fluid passage extending through the housing wall between opposing ends. A valve assembly includes a valve body supported on the housing along the fluid passage and an actuator operatively associated with the valve body. The actuator is operable to displace the valve body between first and second positions. A sensor is supported on the housing and outputs a signal indicative of the first associated input condition. An operating device is supported on the housing and includes a processing device, a communication interface in electrical communication with the processing device, a driver circuit in electrical communication with the valve assembly, and a sensor input interface in electrical communication with the sensor.

An operating module in accordance with the present novel concept for use on an associated air spring having an associated end member and an associated air spring height is provided and includes a housing including a fluid passage extending therethrough. A valve assembly is supported on the housing along the fluid passage and is selectively operable between an open passage condition and a closed passage condition. A distance sensor is supported on the housing and is operative to output a sensor signal indicative of the associated air spring height. An operating device is supported on the housing and includes a signal processing device, a signal interface in electrical communication with the signal processing device, a driver circuit in electrical communication with the valve assembly, and a sensor input interface in electrical communication with the distance sensor.

An air spring assembly in accordance with the present novel concept for use on an associated vehicle that includes an associated suspension control unit is provided and includes a first end member having a first opening extending therethrough and a second end member spaced from the first end member. A flexible wall is secured between the first and second end members and at least partially defines a spring chamber therebetween. At least one of a valve assembly or a sensor is provided. The valve assembly, if provided, is supported on the first end member and is in communication with the spring chamber through the first opening. The sensor, if provided, is supported on one of the first end member or the second end member and is adapted to output a sensor signal. A processing device is supported on the first end member and is in electrical communication with the associated suspension control unit and at least one of the valve assembly or the sensor.

An air spring assembly in accordance with the present novel concept for use on an associated vehicle having an associated supervisory suspension controller is provided and includes a first end member having a first opening, a second end member spaced a distance from the first end member, and a flexible wall secured between the first and second end members and at least partially defining a spring chamber therebetween. A housing includes a fluid passage extending therethrough and is supported on the first end member such that the fluid passage is in communication with the spring chamber through the first opening. A valve assembly is supported on the housing in communication with the fluid passage. The valve assembly is selectively operable between an open passage condition and a closed passage condition. A distance sensor is supported on the first end member and is adapted to output a signal indicative of the distance of the second end member. An operating device is supported on the housing and in communication with the associated supervisory suspension controller. The operating device includes a signal processing device, a signal communication interface in electrical communication with the signal processing device, a driver circuit in electrical communication with the valve assembly, and a sensor input interface in electrical communication with the distance sensor.

An air spring and damper assembly in accordance with the present novel concept for use on an associated vehicle having an associated supervisory suspension controller is provided and includes a damper including first and second damper portions reciprocally interengaging one another. An air spring includes a first end member supported on the first damper portion, a second end member supported on the second damper portion and spaced from the first end member, and a flexible wall secured between the first and second end members and at least partially defining a spring chamber therebetween. A valve assembly is supported on one of the damper and the air spring, and is in operative communication with the spring chamber. A sensor is supported on one of the damper and the air spring, and is adapted to output a sensor signal indicative of an input condition of one of the damper and the air spring. An operating device is supported on one of the damper and the air spring and is in communication with the associated supervisory suspension controller. The operating device includes a signal processing device, a communication interface in electrical communication with the signal processing device, a driver circuit in electrical communication with the valve assembly, and a sensor input interface in electrical communication with the sensor.

A vehicle suspension system in accordance with the present novel concept is provided and includes a supervisory suspension control unit. An air spring includes a first end member, a second end member spaced from the first end member, and a flexible wall secured therebetween at least partially defining a spring chamber. A signal processing device is supported on one of the first end member and the second end member and is in electrical communication with the supervisory suspension control unit. At least one of a sensor or a valve assembly is provided. The sensor, if provided, is supported on one of the first and second end members and is in communication with the signal processing device and adapted to output a sensor signal indicative of an associated input condition to the signal processing device. The valve assembly, if provided, is in communication with the signal processing device and is operatively associated with the air spring. The signal processing device operatively communicates the sensor signal to the supervisory suspension control unit or receives a valve actuation signal form the supervisory control unit for actuating the valve assembly.

A vehicle suspension system in accordance with the present novel concept for an associated vehicle having an associated upper structural member, associated first and second lower structural members and an associated supervisory suspension control unit is provided and includes a first air spring assembly and a second air spring assembly. The first air spring assembly includes a first air spring and a first operating module in communication with the associated supervisory suspension control unit. The first air spring is supported between the associated upper structural member and the associated first lower structural member. The first operating module is supported on the first air spring and includes a first signal processing device, a first sensor in communication with the first signal processing device, and a first valve assembly in communication with the first signal processing device and operatively associated with the first air spring. The second air spring assembly includes a second air spring and a second operating module in communication with the associated supervisory suspension control unit. The second air spring is supported between the associated upper structural member and the associated second lower structural member. The second operating module is supported on the second air spring and includes a second signal processing device, a second sensor in communication with the second signal processing device and a second valve assembly in communication with the second signal processing device and operatively associated with the second air spring.

A method of operating a vehicle suspension system in accordance with the present novel concept is provided and includes providing a vehicle suspension system including a supervisory suspension controller, an air spring assembly including an air spring, a sensor and a signal processing device, and a communication network extending between the supervisory suspension controller and the signal processing device. The method also includes generating a sensor output signal using the sensor and communicating the sensor output signal to the signal processing device. The method also includes generating a first communication signal corresponding to the sensor output signal using the signal processing device. The method further includes communicating the first communication signal to the supervisory suspension controller and processing the first communication signal using the supervisory suspension controller. The method also includes making a determination having a relation to the vehicle suspension system based at least partially upon the first communication signal using the supervisory suspension controller, and generating a second communication signal corresponding to the determination using the supervisory suspension controller. The method further includes communicating the second communication signal to the signal processing device.

DETAILED DESCRIPTION

Figure 1:
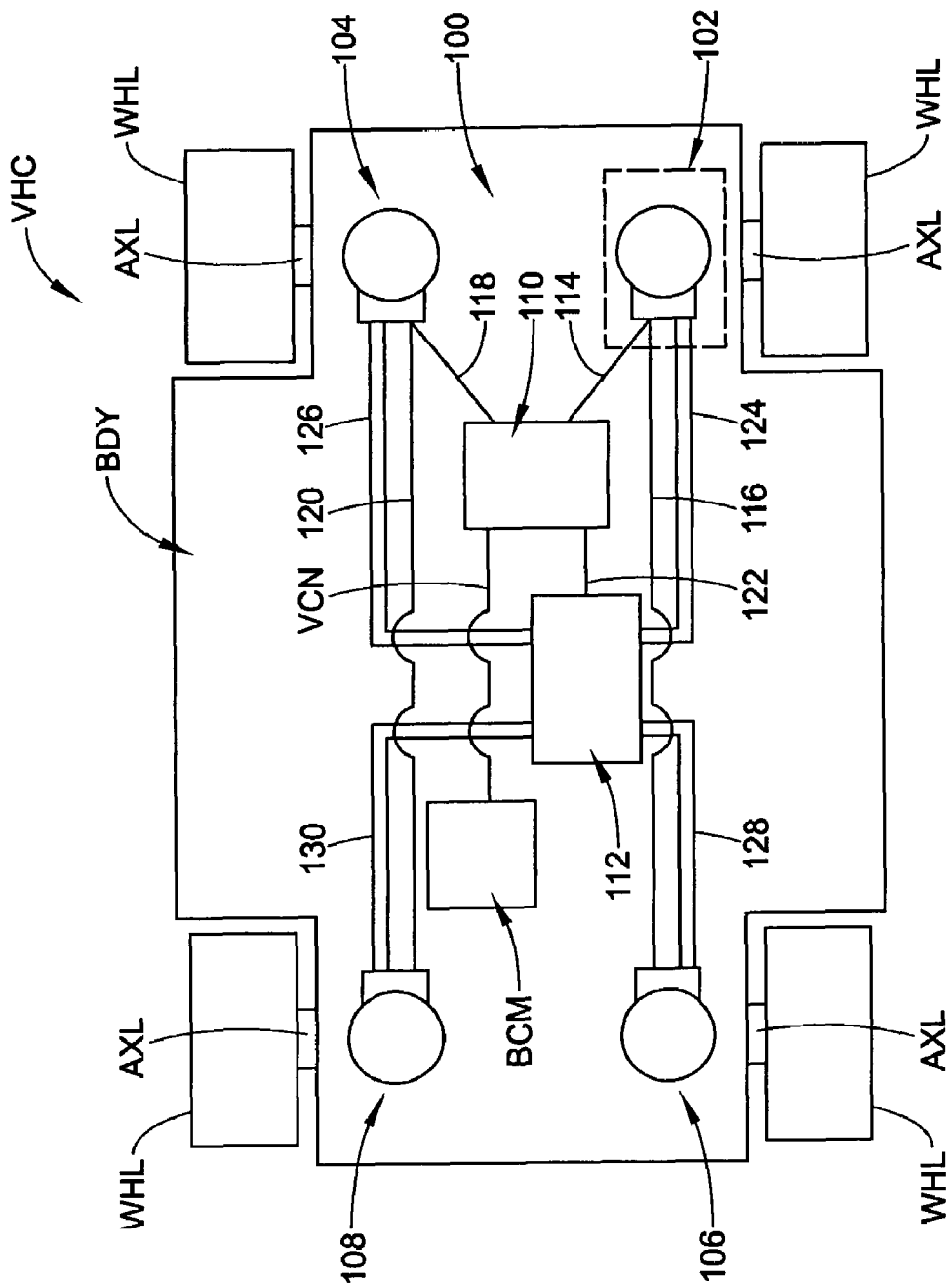
FIG. 1 is a top plan view schematically illustrating one exemplary embodiment of a vehicle suspension system in accordance with the present novel concept.

Turning now to the drawings wherein the showings are for the purpose of illustrating exemplary embodiments of the present novel concept, and not as a limitation of the same, FIG. 1 illustrates a vehicle VHC having a wheel WHL supported adjacent each corner thereof. Vehicle VHC includes an upper vehicle structure UVS (FIGS. 3 and 6), such as a vehicle chassis or body BDY, and lower wheel-engaging members WEM (FIGS. 3 and 6), such as axles AXL extending from body BDY.

In the embodiment shown in FIG. 1, a vehicle suspension system 100 that includes air spring assemblies 102, 104, 106 and 108 is in operative association with vehicle VHC. Suspension system 100 also includes a supervisory control unit, such as a master controller 110, for example, and an air supply system 112. Air spring assemblies 102-108 are in communication with a supervisory control unit (e.g., master controller 110), and send and receive signals, data and/or other communications therebetween. The supervisory control unit (e.g., master controller 110) is also in communication with air supply system 112 to selectively operate the same and thereby selectively supply compressed air to and from the air spring assemblies. Additionally, the supervisory control unit (e.g., master controller 110) is shown as being in communication with another control system of the vehicle, such as global chassis controller, an active roll control system, an automatic braking system, or any other suitable system that could be disposed within a central or consolidating housing, such as a body control module BCM, for example, using a suitable vehicle network through a lead or vehicle network connection VCN. As such, the supervisory control unit (e.g., master controller 110) is operable to make decisions regarding the operation and performance of air spring assemblies 102-108 and to communicate corresponding control instructions to the air springs assemblies. For the purposes of clarity and ease of reading, specific reference will be made hereinafter to master controller 110 (and master controller 110' in FIG. 2) as one example of a supervisory control unit. However, it is to be understood that any suitable control unit capable of making decisions and coordinating control, operation and/or performance of the air spring assemblies can be used.

In the embodiment shown in FIG. 1, the air spring assemblies are in communication with master controller 110 using a system or local network that includes suitable connectors or leads 114, 116, 118 and 120. Air supply system 112 is in communication with master controller 110 through a suitable connection or lead 122. Additionally, air supply system 112 acts as a compressed air source and communicates (e.g., supplies and/or exhausts) compressed air to/from the air spring assemblies through fluid lines 124, 126, 128 and 130. As such, air supply system 112 includes at least a compressor (not shown) and a fluid line connector manifold (not shown) in fluid communication with the compressor. It will be appreciated that the fluid line connector manifold can be integrated with the compressor or provided separately therefrom. The system can also optionally include a reservoir (not shown) for storing compressed air. Additionally, an inlet valve and/or an exhaust valve can optionally be included, either separately or integrated with another component, such as a compressor or reservoir, for example. As will be described in further detail hereinafter, however, one embodiment of the air supply system does not include a typical valve block, which would normally be included with a plurality of valves disposed thereon that are selectively actuated to place the compressed air source, such as the compressor or reservoir, in fluid communication with one or more of the air springs.

Figure 2:
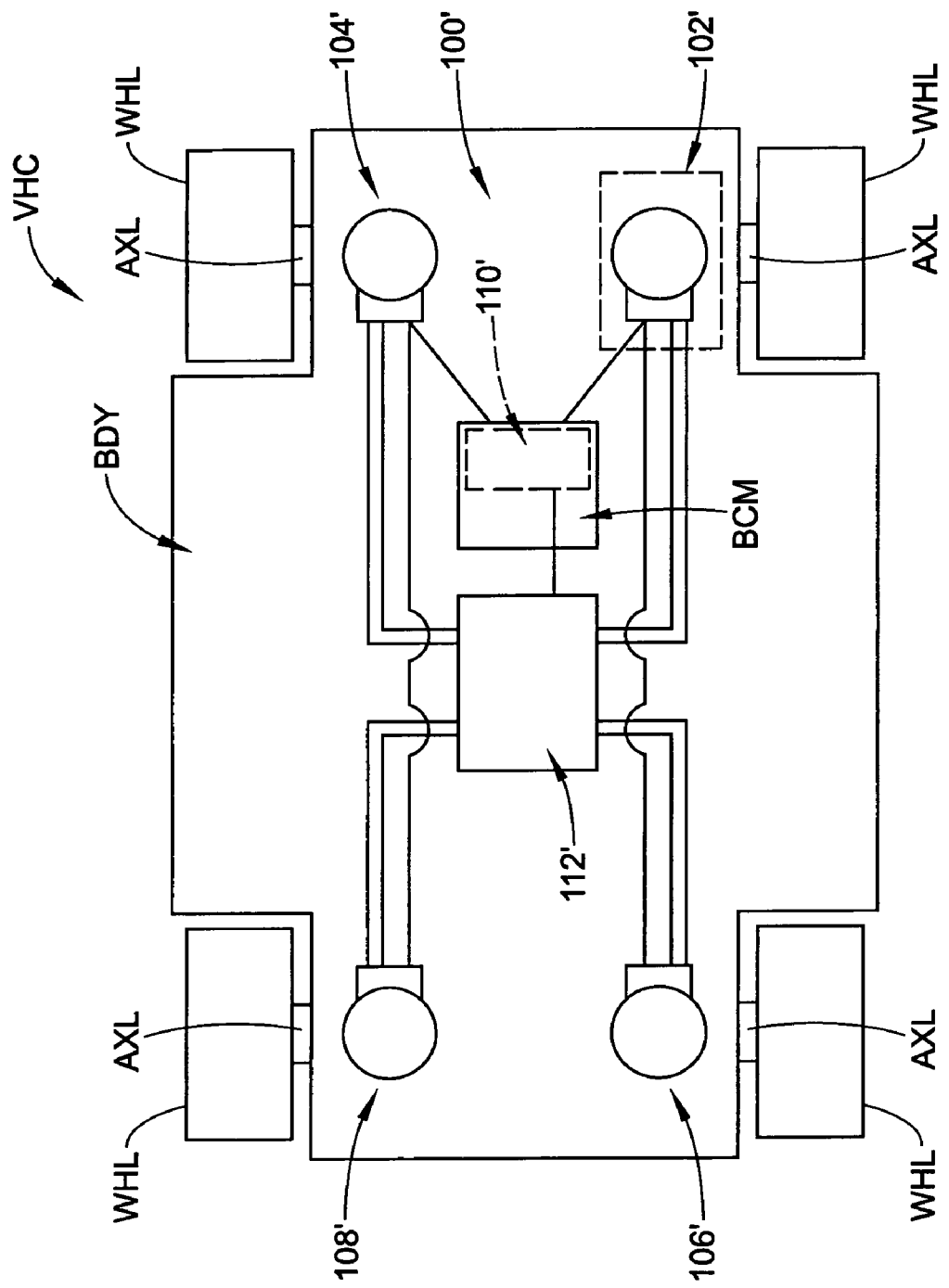
FIG. 2 is a top plan view schematically illustrating another exemplary embodiment of a vehicle suspension system in accordance with the present novel concept.

An alternate embodiment of vehicle suspension system 100 is shown in FIG. 2 as vehicle suspension system 100' supported on vehicle VHC. It will be appreciated that suspension system 100' is substantially similar to suspension system 100. However, master controller 110' in suspension system 100' is shown as being assembled into or otherwise stored within another system or structure, such as global chassis controller or body control module BCM, for example, rather than being a separately mounted component as in assembly 100. Vehicle suspension system 100' includes air spring assemblies 102', 104', 106' and 108', and it will be recognized from FIG. 2 that the same remain in communication with master controller 110', as does air supply system 112'.

Figure 3:
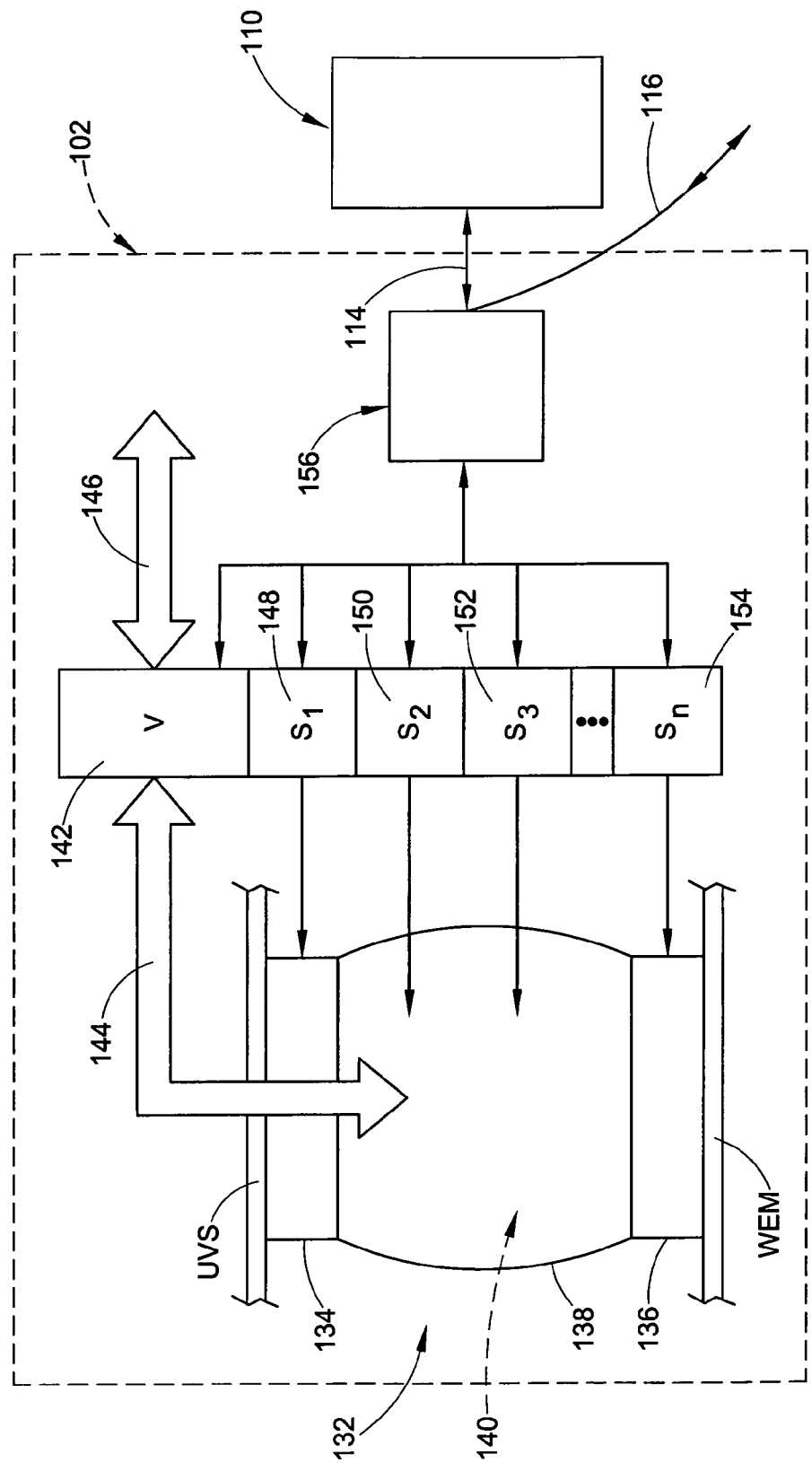
FIG. 3 schematically illustrates one exemplary embodiment of an air spring assembly in accordance with the present novel concept.

One exemplary embodiment of an air spring assembly in accordance with the present novel concept is schematically illustrated in FIG. 3 as air spring assembly 102, though it will be appreciated that the same is representative of air spring assemblies 104-108, as well. Air spring assembly 102 includes an air spring 132 having a first end member 134, such as a top plate, bead plate or piston, for example. A second end member 136, such as a top plate, bead plate or piston, for example, is spaced from the first end member and a flexible wall 138, such as an elastomeric sleeve or bellows, for example, is secured therebetween and at least partially defines a spring chamber 140. First end member 134 is shown in abutting engagement with upper vehicle structure UVS of the vehicle, such as a frame member or body panel of the vehicle body. Second end member 136 is shown in abutting engagement with a wheel-engaging member WEM, such as an axle or a suspension arm, for example. The end members can be secured on the associated vehicle structures in any suitable manner, such as by using threaded fasteners (not shown), for example. Air spring assembly 102 also includes a valve 142 in fluid communication with spring chamber 140, as indicated by arrow 144. Additionally, valve 142 is in fluid communication with an air supply system as indicated by arrow 146, such as air supply system 112 through fluid line 124, for example. Valve 142 can be of any suitable type, kind or configuration, such as a 2-position, 3-position or proportional/variable position valve, for example.

Air spring assembly 102 also includes one or more sensors, which can be of any suitable type, kind and/or configuration, for sensing an input or condition (hereinafter input conditions) of the vehicle, suspension system, and/or suspension components, either individually or in combination. Such input conditions can include, without operating as a limitation, force inputs, such as load, for example; distance inputs, such as vehicle or air spring height, for example; acceleration inputs, such as lateral, longitudinal or vertical acceleration of the vehicle or component thereof, for example; pressure conditions, such as air pressure within a spring chamber of an air spring, for example; and temperature conditions, such as the temperature of the air within an air spring, for example. Additionally, any number of sensors can be provided on or in operative association with air spring assembly 102, as indicated generally by reference characters $S_1$ to $S_n$.

A first sensor 148 is indicated as being in operative association with first end member 134. Second and third sensors 150 and 152 are indicated as being in operative association with spring chamber 140. Another sensor 154 is indicated as being in operative association with second end member 136. Some examples of suitable sensors include, without limitation, height or distance sensors (e.g., electromechanical sensors, such as linear position transducers and mechanically-linked rotary potentiometers, ultrasonic wave sensors, and electromagnetic wave sensors, such as RF and laser sensors), pressure sensors or transducers, temperature sensors or thermocouples, and accelerometers, including single- and multi-axis accelerometers. Thus, it is to be distinctly understood that sensors of any number or combination can be used, including one or more of any particular type, kind or configuration of sensor that may be desired.

For example, sensor 148 could be a multiple axis accelerometer operative to output one or more signals indicative of an acceleration input acting on the first end member. As another example, sensor 150 could be a height sensor adapted to broadcast an ultrasonic or electromagnetic wave (e.g., RF or laser) and determine a distance between the first and second end members based thereon, and output a signal indicative of the same. As a further example, sensor 152 could be a pressure sensor or transducer operative to output a signal indicative of the air pressure within the spring chamber. And, as still another example, sensor 154 could be a single axis accelerometer operative to output a signal indicative of an acceleration input acting on the wheel or second end member.

Air spring assembly 102 also includes an operating device 156 that is in communication with the one or more valves and sensors that are operatively associated with air spring 132, such as valve 142 and sensors 148-154, for example. Additionally, operating device 156 is in communication with master controller 110 through lead 114, and can optionally be in communication with air spring assembly 106 through lead 116.

Figure 4:
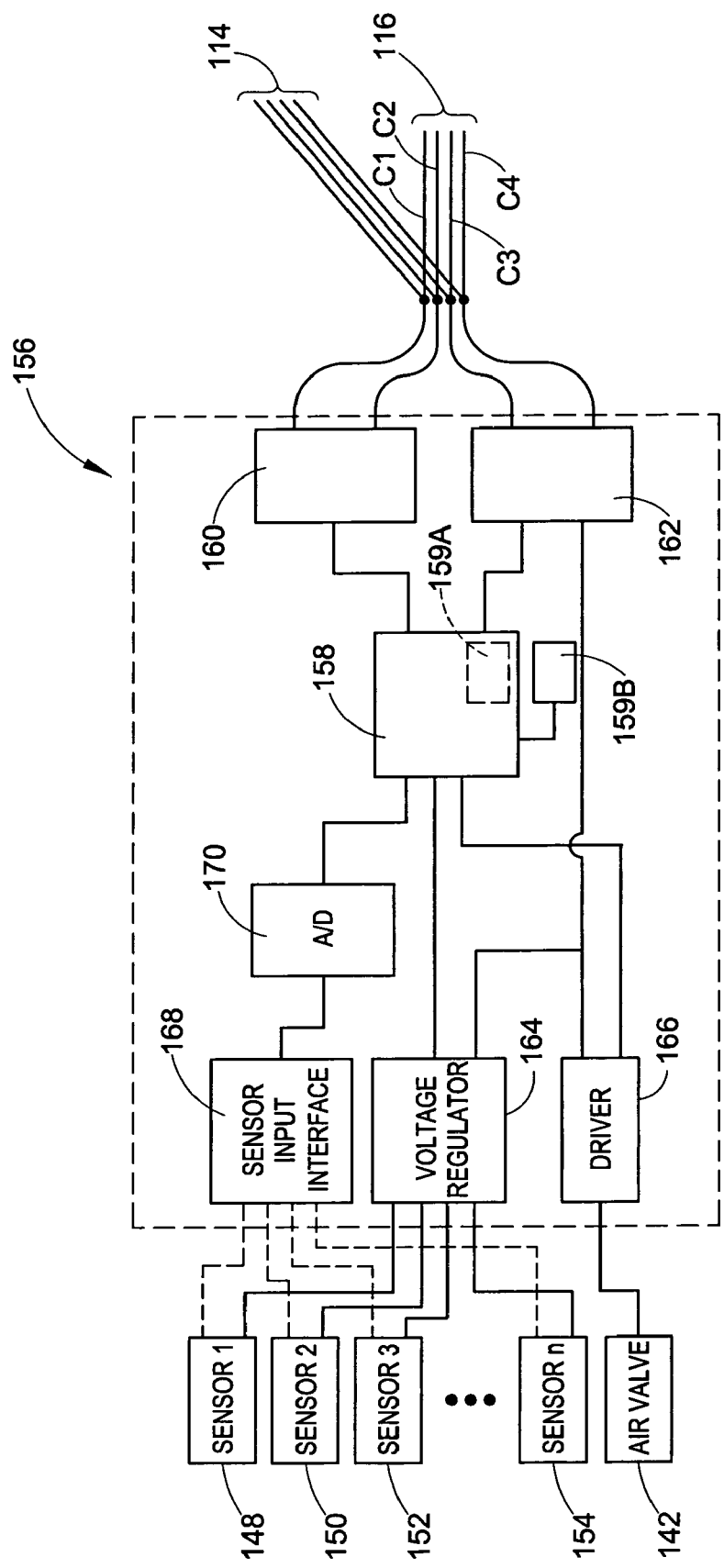
FIG. 4 schematically illustrates one exemplary embodiment of the communication system in FIG. 3.

FIG. 4 schematically illustrates one exemplary embodiment of an operating device in accordance with the present novel concept, such as operating device 156, for example, which is shown in FIG. 3 in communication with valve 142 and sensors 148-154. Additionally, operating device 156 is connected to leads 114 and 116, as shown in FIGS. 3 and 4. Operating device 156 includes a suitable signal processing device 158, which should not be confused with a controller, such as for making decisions or logic-based determinations, as has been discussed above, for example. It is to be appreciated that any suitable processing device can be used as signal processing device 158, including, without limitation, a processor, a microprocessor, a digital signal processor, a microcontroller or a microcomputer, for example. A memory can be optionally provided either as an integral component of the signal processing device, as indicated by box 159A, or as a separately mounted component in operative communication with the signal processing device, as indicated by item 159B. Additionally, the memory can be of any suitable type or kind, such as, without limitation, read-only memory, random-access memory, re-programmable memory, non-programmable memory or any combination thereof, for example. Though it will be appreciated that any suitable type, kind or configuration of leads can be used, leads 114 and 116 are indicated as having four conductors C1, C2, C3 and C4. Such four-conductor leads are commonly used in vehicle communication networks and typically include two communication or signal conductors, such as conductors C1 and C2, for example, as well as a power conductor and a ground conductor, such as conductors C3 and C4, respectively, for example.

Operating device 156 includes a signal or communication interface 160 and a power connection interface 162. In the exemplary embodiment shown in FIG. 4, conductors C1 and C2 are connected to terminals (not shown) of communication interface 160, and power and ground conductors C3 and C4 are connected to terminals (not shown) of power connection interface 162. Communication interface 160 is in communication with signal processing device 158, and is suitable for relaying signals to, from and between the signal processing device and/or the associated vehicle or local system network. Power connection interface 162 is in electrical communication with signal processing device 158 as well as with a voltage regulator 164 and a driver circuit 166.

Voltage regulator 164 is in communication with signal processing device 158 and is adapted for outputting suitably conditioned electrical power to the sensors. It will be appreciated, however, that one or more of the sensors may not utilize an external power source and, as such, may not be in communication with voltage regulator 164. Driver circuit 166 is also in communication with signal processing device 158 and is operable to selectively actuate valve 142. It will be appreciated that driver circuit 166 can actuate the valve in any suitable manner, such as by pulse width modulation or hit-and-hold actuation, for example. Operating device 156 also includes a sensor input interface 168 and an analog-to-digital converter 170. The sensors are in communication with interface 168 and output corresponding signals thereto. In the present embodiment, the sensors are adapted to output analog signals to sensor interface 168, which communicate the same to analog-to-digital converter 170 which, in turn, outputs corresponding digital signals to signal processing device 158.

Figure 5:
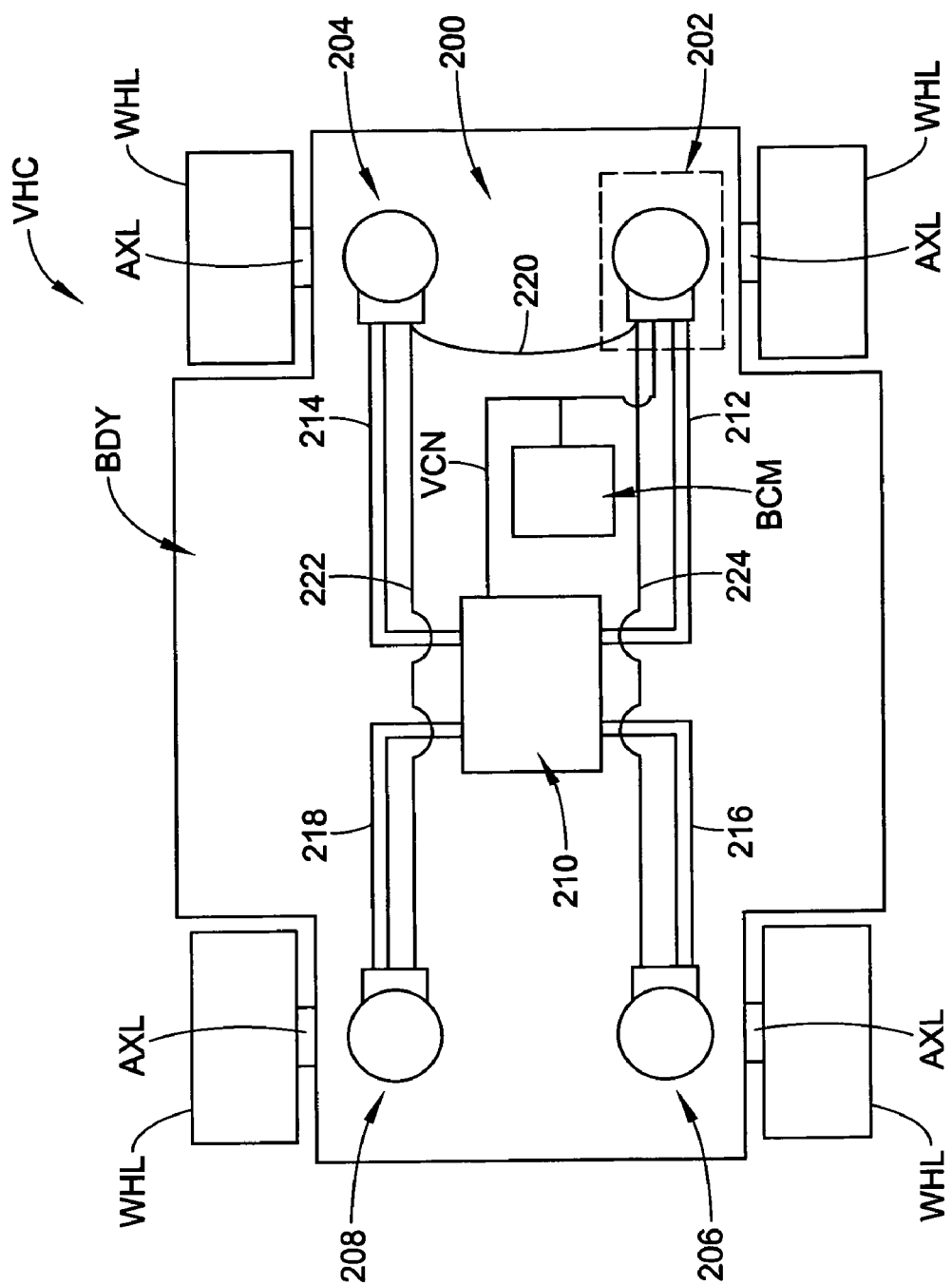
FIG. 5 is a top plan view schematically illustrating a further exemplary embodiment of a vehicle suspension system in accordance with the present novel concept.

An alternate embodiment of a vehicle suspension system 200 is shown in FIG. 5 in operative association with vehicle VHC. Suspension system 200 includes a plurality of air spring assemblies 202, 204, 206 and 208. Suspension system 200 also includes an air supply system 210 in fluid communication with the air spring assemblies through fluid lines 212, 214, 216 and 218. Air spring assemblies 204, 206 and 208 are substantially identical to air assemblies 102, 104, 106 and 108 shown in and described with regard to suspension system 100 in FIGS. 1, 3 and 4.

Suspension system 200 differs from suspension system 100 in that air spring assembly 202 includes a supervisory control unit as well as an operating device. Whereas, suspension system 100 includes a supervisory control unit (e.g., master controller 110) that is mounted separate and apart from the air spring assemblies. As such, air spring assemblies 204 and 208 are in communication with an operating device portion of air spring assembly 202 using a system or local network through leads 220 and 222. Similarly, air spring assembly 206 is in communication with an operating device portion of air spring assembly 202 using a system or local network through lead 224. Furthermore, one or more control systems (e.g., global chassis controller, automatic braking system, active roll control system), such as might be located in body control module BCM, for example, and air supply system 210 are in communication with a supervisory control portion of air spring assembly 202 using a suitable vehicle network through vehicle network connection VCN. Thus, it will be recognized that air spring assembly 202 includes at least two distinct portions, namely, an operating device portion and a supervisory control portion (e.g., a master controller).

Figure 6:
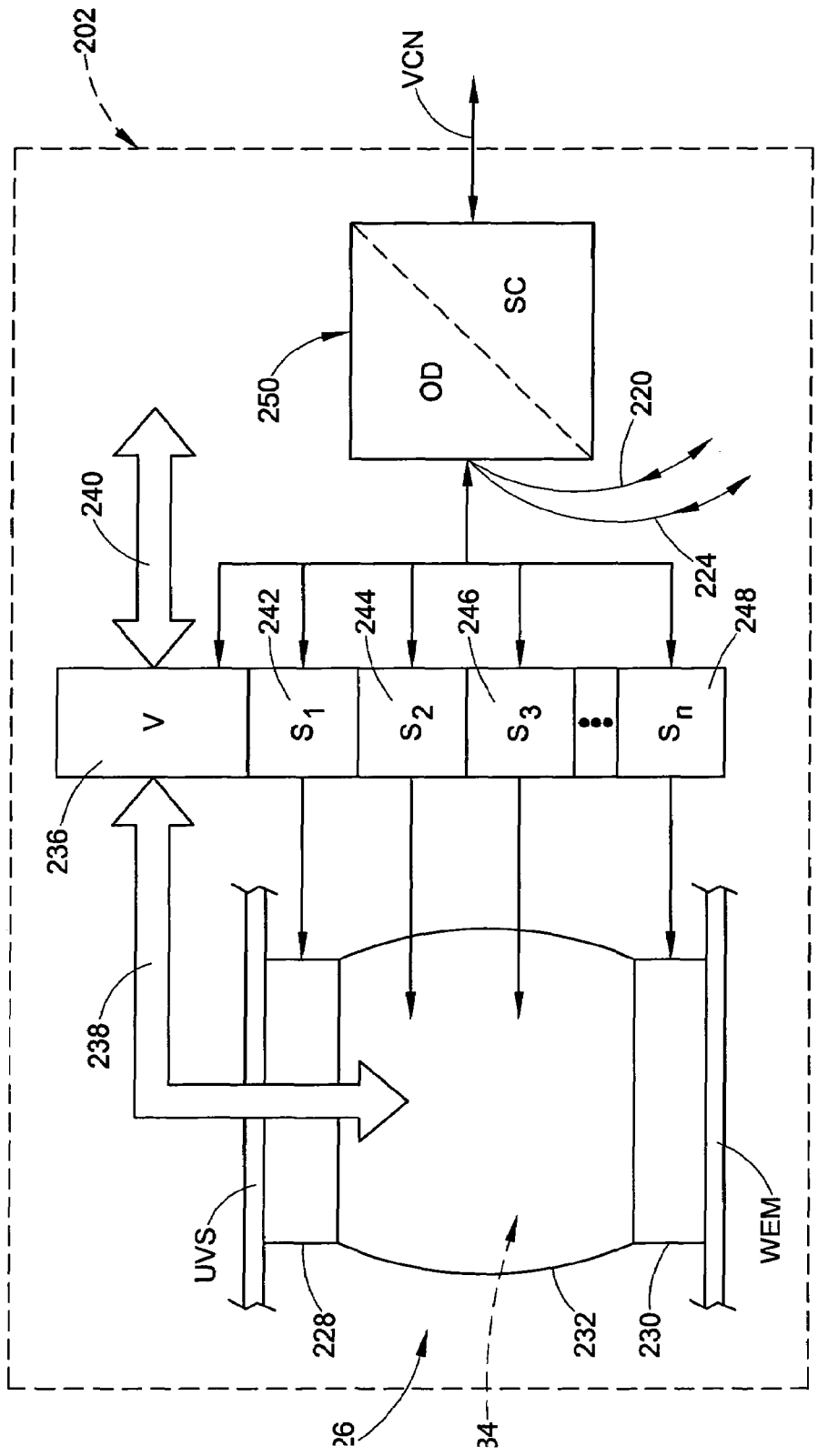
FIG. 6 schematically illustrates another exemplary embodiment of an air spring assembly in accordance with the present novel concept.

FIG. 6 illustrates another exemplary embodiment of air spring assembly in accordance with the present novel concept, such as air spring assembly 202, for example. The air spring assembly includes an air spring 226 that has a first end member 228, such as a top plate, bead plate or piston, for example, and a second end member 230, such as a top plate, bead plate or piston, for example. A flexible wall 232 is secured between end members 228 and 230 and at least partially defines a spring chamber 234 therebetween.

Air spring assembly 202 also includes a valve 236 in fluid communication with spring chamber 234 as indicated by arrow 238. Additionally, valve 236 is in fluid communication with a compressed air source as indicated by arrow 240, such as air supply system 210 through fluid line 212, for example. Air spring assembly 202 further includes a plurality of sensors, indicated generally by reference characters $S_1$ to $S_n$, as described in detail with regard to air spring assembly 102, for example. As shown in FIG. 6, air spring assembly 202 includes sensors 242, 244, 246 and 248, which, along with valve 236, are in electrical communication with a combination operating and supervisory controller device 250 having at least two operatively distinct portions, namely, an operating device indicated generally by reference characters OD and a supervisory controller indicated generally by reference characters SC.

Device 250 is in communication with the other air spring assemblies using a system or local network through leads 220 and 224, as well as with one or more control systems (e.g., global chassis controller, automatic braking system, active roll control system) such as might be located in body control module BCM, for example, and air supply system 210 using the vehicle network through vehicle network connection VCN. As such, device 250 includes a first operable portion acting as an operating device (similar to operating device 156 discussed above) receiving signals from the associated sensors regarding operational inputs and conditions of air spring 226. Additionally, device 250 includes a second operable portion acting as a supervisory controller (similar to master controller 110 discussed above, for example) operative to coordinate communications to and from the other air spring assemblies of suspension system 200 in a capacity as a supervisory or master controller, and communicates information, data and other signals regarding the vehicle suspension system to and from other systems and/or components, such as the body control module and the air supply system, for example, using the vehicle network.

Figure 7:
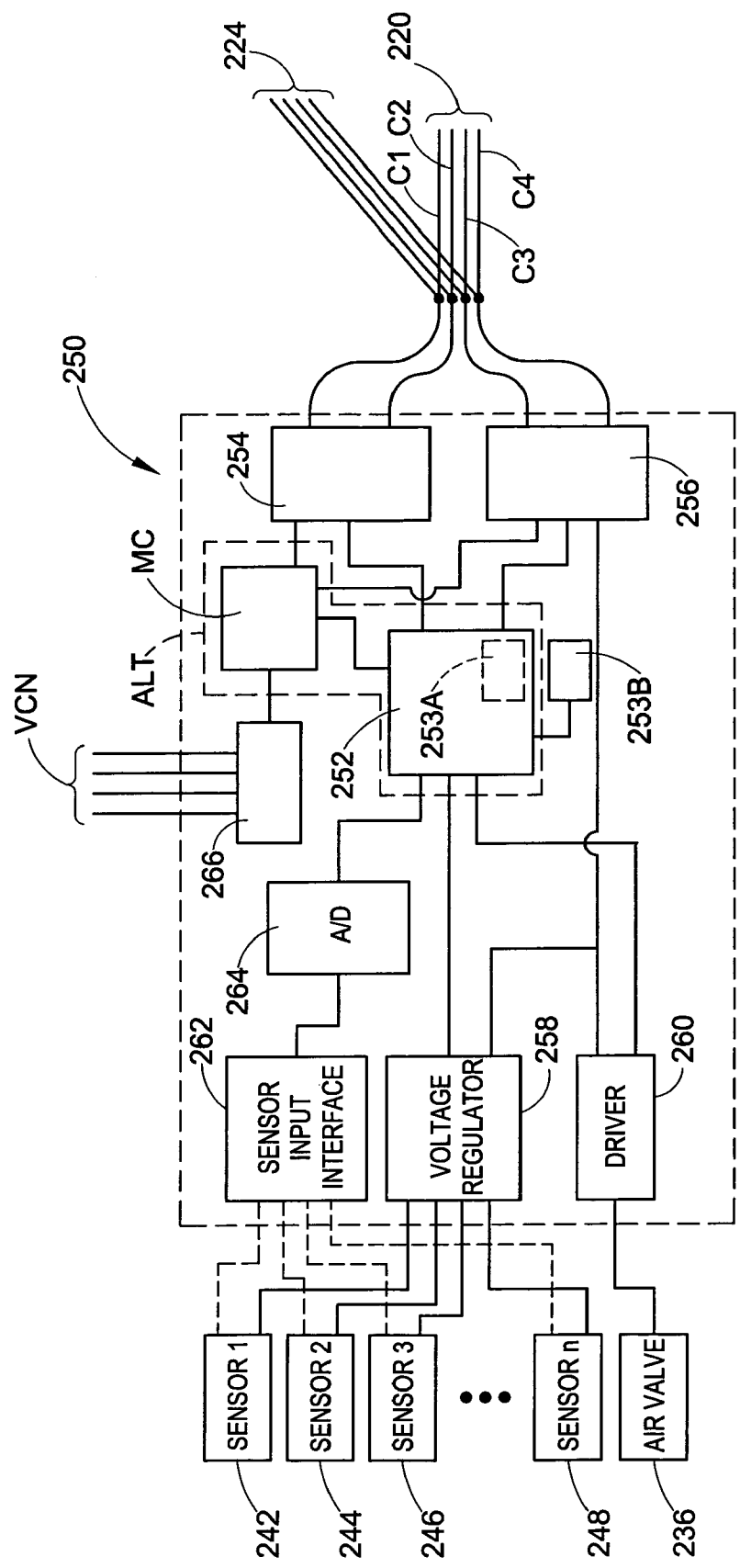
FIG. 7 schematically illustrates one exemplary embodiment of the communication system in FIG. 6.
Figure 8:
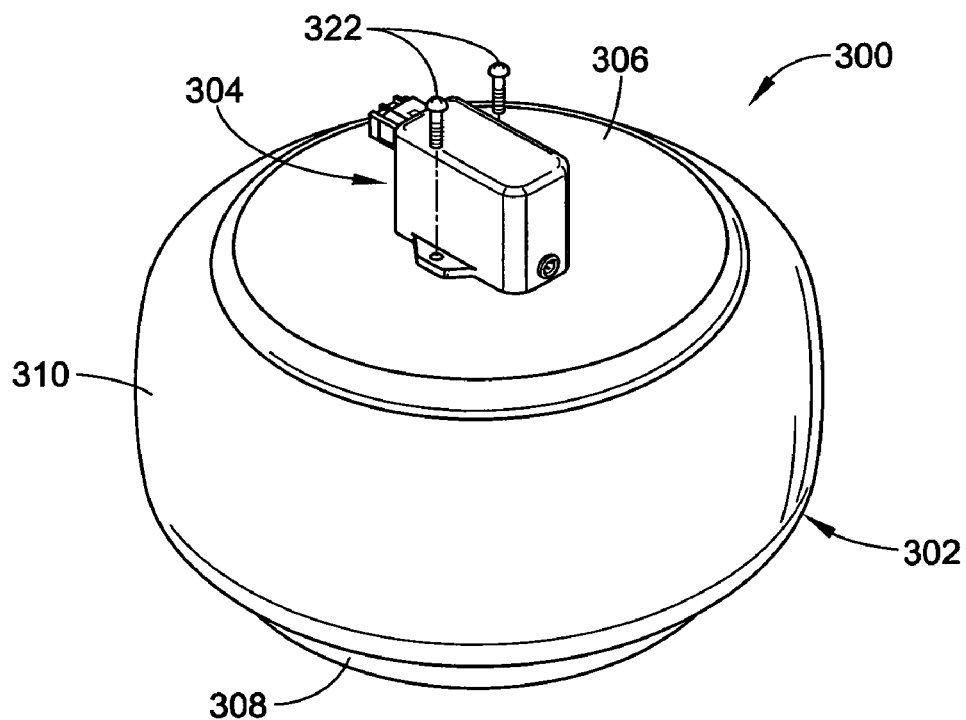
FIG. 8 is a perspective view of one exemplary embodiment of an air spring assembly in accordance with the present novel concept.
Figure 9:
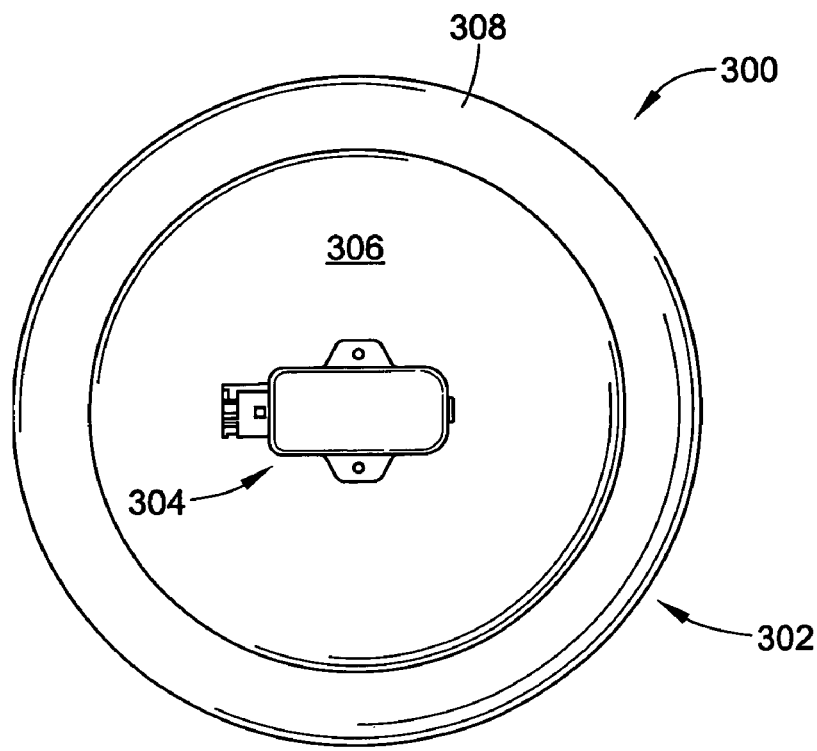
FIG. 9 is a top plan view of the air spring assembly in FIG. 8.
Figure 10:
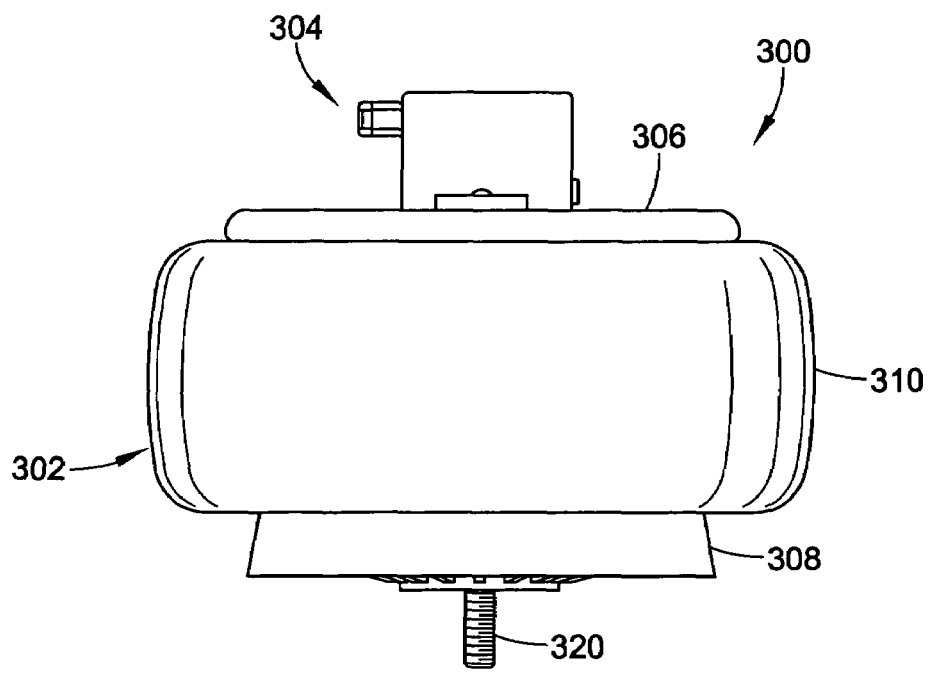
FIG. 10 is a front elevation view of the air spring assembly in FIGS. 8 and 9.
Figure 11:
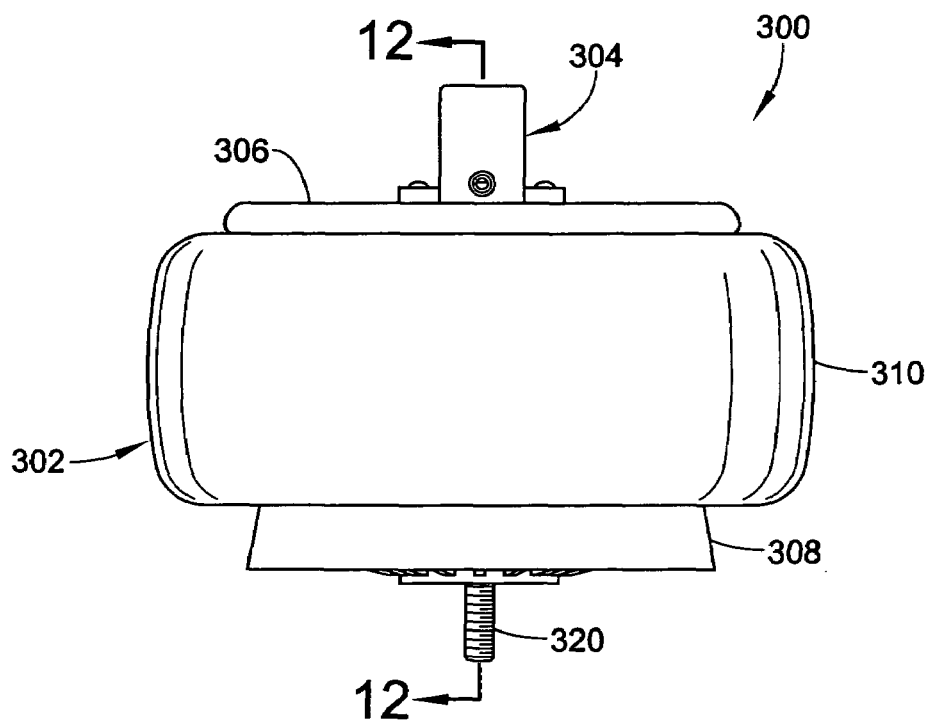
FIG. 11 is a right side view of the air spring assembly in FIGS. 8-10.

FIG. 7 schematically illustrates an exemplary embodiment of a combination supervisory control unit and operating device, such as device 250, for example, in accordance with the present novel concept. Device 250 includes a signal processing device 252 as well as a supervisory or master controller MC. Any suitable component or group of components can be used as a signal processing device 252, such as a processor, a microprocessor, a digital signal processor, a microcontroller or a microcomputer, for example. A memory can optionally be provided, either as an integral component of the signal processing device, as indicated by box 253A, or as a separately mounted component in operative communication with the processing device, as indicated by item 253B. Additionally, the memory can be of any suitable type or kind, such as, without limitation, read-only memory, random-access memory, re-programmable memory, non-programmable memory or any combination thereof, for example. Master controller MC can be formed from any suitable component or group of components, including, without limitation, a processor, microprocessor, digital signal processor, microcontroller, microcomputer or any other suitable device or component. Additionally, master controller MC can include a suitable memory device (not shown), either integral with or separate from the any other components. Optionally, signal processing device 252 and master controller MC could be formed as two different operational portions on the same device or component as suggested by dashed line ALT.

A first signal or communication interface 254 and a power connection interface 256 are in electrical communication with signal processing device 252 and master controller MC. Leads 220 and 224 are in electrical communication with device 250 by way of conductors C1 and C2 connected to terminals (not shown) of communication interface 254, and power and ground conductors C3 and C4 connected to terminals (not shown) of power connection interface 256. Additionally, device 250 includes a voltage regulator 258, a driver circuit 260, a sensor input interface 262 and an analog-to-digital converter 264 interfacing with a valve, such as valve 236, for example, one or more sensors, such as sensors 242-248, for example, and a signal processing device, such as signal processing device 252, for example, in a manner substantially identical to that shown and described with regard to operating device 156 in FIG. 4. Combination device 250 differs from operating device 156 in that device 250 includes a supervisory controller, such as master controller MC, for example, and a second signal or communication interface 266 in communication with the master controller that connects to a vehicle network in a suitable manner, such as by interfacing with vehicle network connection VCN, for example.

One beneficial attribute of a vehicle suspension system in accordance with the present novel concept is the resulting communication of performance inputs and conditions at the corners of the vehicle onto the vehicle network, such that data associated with these inputs and conditions is available to other vehicle systems. Furthermore, it is likely that this can be accomplished using a reduced number of sensors compared to the number of sensors that are commonly utilized for the operation of known vehicle systems, as illustrated in Tables A and B, which are shown below.

TABLE A

Sensors typical of known vehicles

| Brake System | Height Sensor | Pressure Sensor (Corner) | Wheel Accelerometer | Steering Angle Sensor | Yaw Rate Sensor (Body accelerometer can be dual axis) | Wheel Speed Sensor |
|---|---|---|---|---|---|---|
| Air System | X | X | X | X | X | X |
| Steering System | X | X |   | X |   |   |
| Roll Control System | X | X | X | X |   |   |
| Lighting System |   |   | X | X | X |   |
| Damping System | X | X |   |   |   |   |

TABLE B

Sensor for vehicle in accordance with the present disclosure

| Brake System | Height Sensor | Pressure Sensor (Corner) | Wheel Accelerometer | Steering Angle Sensor | Yaw Rate Sensor (Body accelerometer can be dual axis) | Wheel Speed Sensor |
|---|---|---|---|---|---|---|
| Air System |   |   |   | X |   | X |
| Steering System | X | X | X | X | X |   |
| Roll Control System |   |   |   | X |   |   |
| Lighting System |   |   |   | X |   |   |
| Damping System |   |   |   | X |   |   |

It will be appreciated that each of the above listed vehicle systems may not, in practice, provide a separate sensor for each input or condition that is to be measured or otherwise monitored. As such, there may be some sharing of data and/or sensor signals between the various vehicle systems. However, by communicating data, signals and/or other information related to the various inputs and/or conditions at two or more corners of the vehicle to the vehicle network, this information can be used by the other systems and it is believed that a significant reduction in the number of sensors on a vehicle can be achieved. Additionally, this is expected to lead to numerous other benefits and advantages, including a reduction in the amount of wiring and connectors that are used and the attendant reduction in weight, as well as reduced build complexity and improved assembly, for example.

Additionally, providing signal processing devices at the corners of the vehicle relocates processing power away from the densely packed central control modules, such as the body control module discussed above, for example. This reduce the number of components in central control modules, creating additional space for other components and/or reducing the generation of heat loads. Furthermore, providing processing power at the air spring assembly can permit the development of self-diagnostics and other procedures that are currently not available.

Turning now to FIGS. 8-12, one exemplary embodiment of an air spring assembly 300 in accordance with the present novel concept includes an air spring 302 and an operating module 304 secured thereon. Air spring 302 includes a first end member 306, such as a top plate, bead plate or piston, for example. A second end member 308, such as a top plate, bead plate or piston, for example, is spaced from the first end member. A flexible wall 310, such as an elastomeric sleeve or bellows, for example, is secured between the first and second end members and at least partially defines a spring chamber 312 (FIG. 12) formed therebetween.

In the exemplary embodiment shown in FIGS. 8-12, first end member 306 is an upper end member or bead plate secured along a first open end 314 of flexible wall 310. Additionally, second end member 308 is a piston that engages a second open end 316 of flexible wall 310, which is secured along the piston in a conventional manner using an end closure 318. A fastener 320, such as a threaded mounting stud, for example, extends through the end closure and the piston and thereby secures the same together. The fastener can also be used to secure the air spring assembly along a structural component of the vehicle. Alternately, separate fastening devices (not shown) can be used to secure the air spring assembly along a structural component of the vehicle.

An operating module, such as operating module 304, for example, can be supported on or along a suspension component in any suitable manner or arrangement. As shown in the present exemplary embodiment, operating module 304 is supported on an outer surface of first end member 306. It will be appreciated, however, that the operating module could alternately be supported on or along an inside surface of an air spring or other component. Additionally, an operating module, such as operating module 304, for example, can be secured on such a component in any suitable manner, such as by using mechanical fasteners, such as screws, nuts, bolts or rivets, for example. As another example, an operating module could be secured on a suspension component using a flowable material, such as an adhesive, sealant, or welded or brazed joint, for example. As still another example, an operating module or the components thereof could be formed into a suspension component, such as by being molded into a polymeric end member of an air spring, for example. In one exemplary embodiment, threaded fasteners 322 (FIG. 8) are used. Operating module 304 and first end member 306 are preferably sealingly engaged to prevent any substantial amount of leakage therebetween. It will be appreciated that any suitable sealing arrangement can be used, including sealing members, such as O-rings or quad rings, for example, compressively seated between the operating module and the end member. Additionally, or in the alternative, a suitable gasket or flowable sealant could be used.

Figure 12:
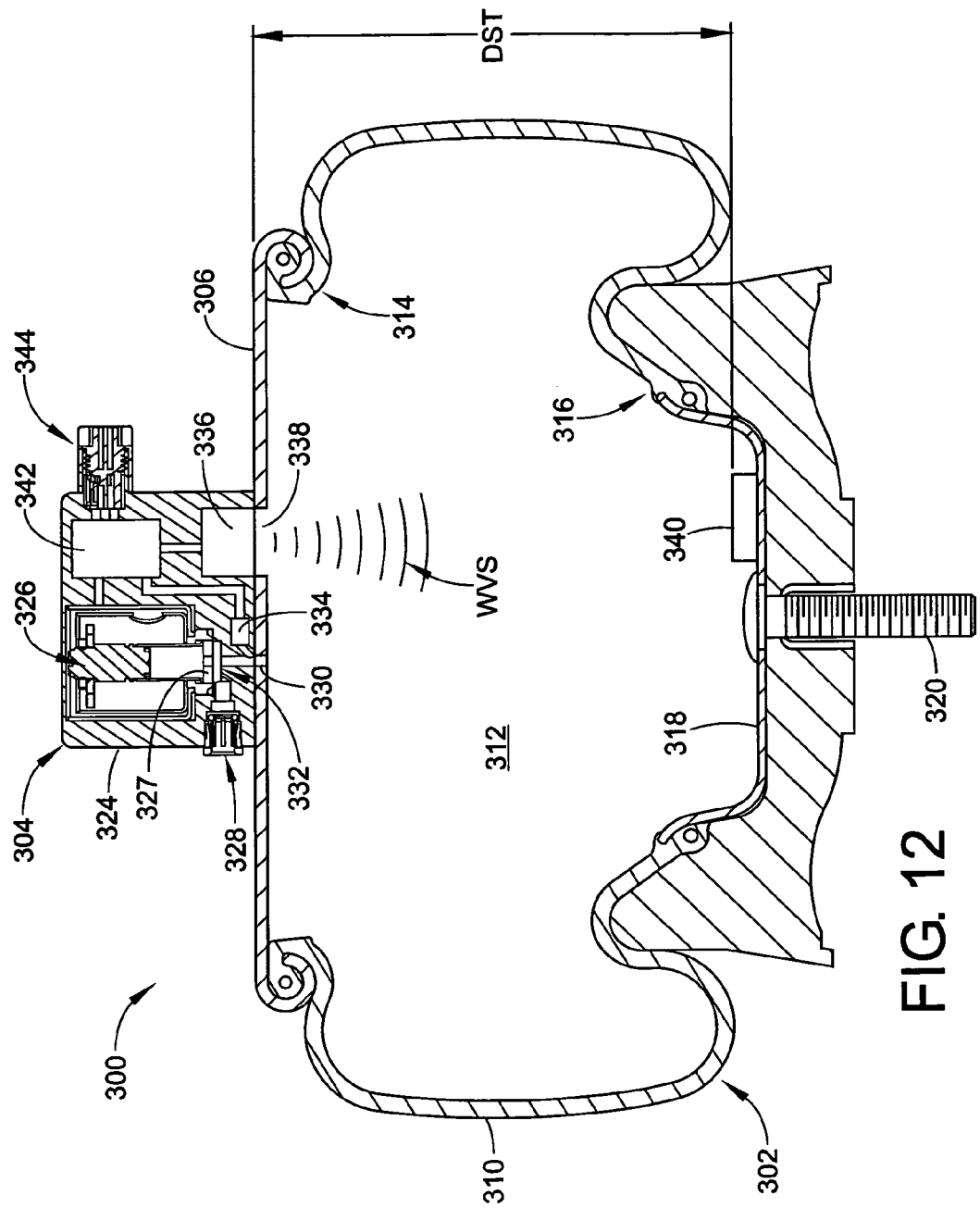
FIG. 12 is a rear elevation view, in partial cross section, of the air spring assembly in FIGS. 8-11 taken along line 12-12 in FIG. 11.
Figure 13:
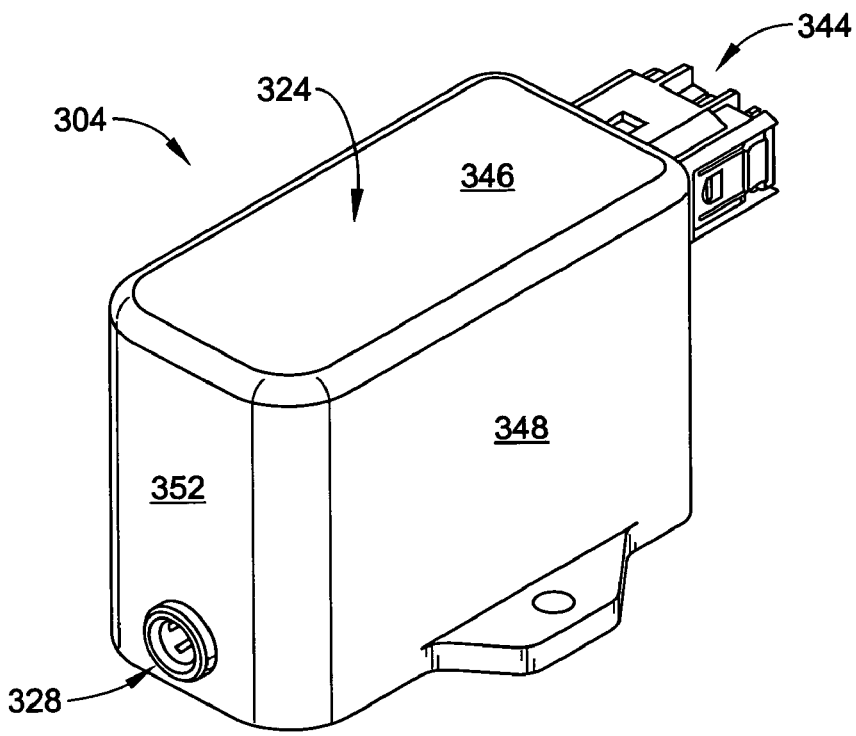
FIG. 13 is a perspective view of one exemplary embodiment of an operating module in accordance with the present novel concept.
Figure 14:
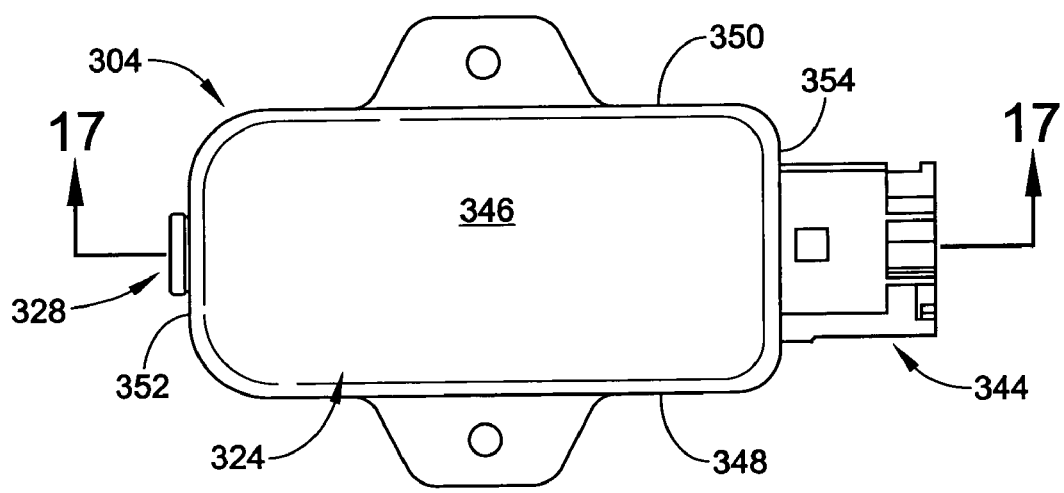
FIG. 14 is a top plan view of the operating module in FIG. 13.
Figure 15:
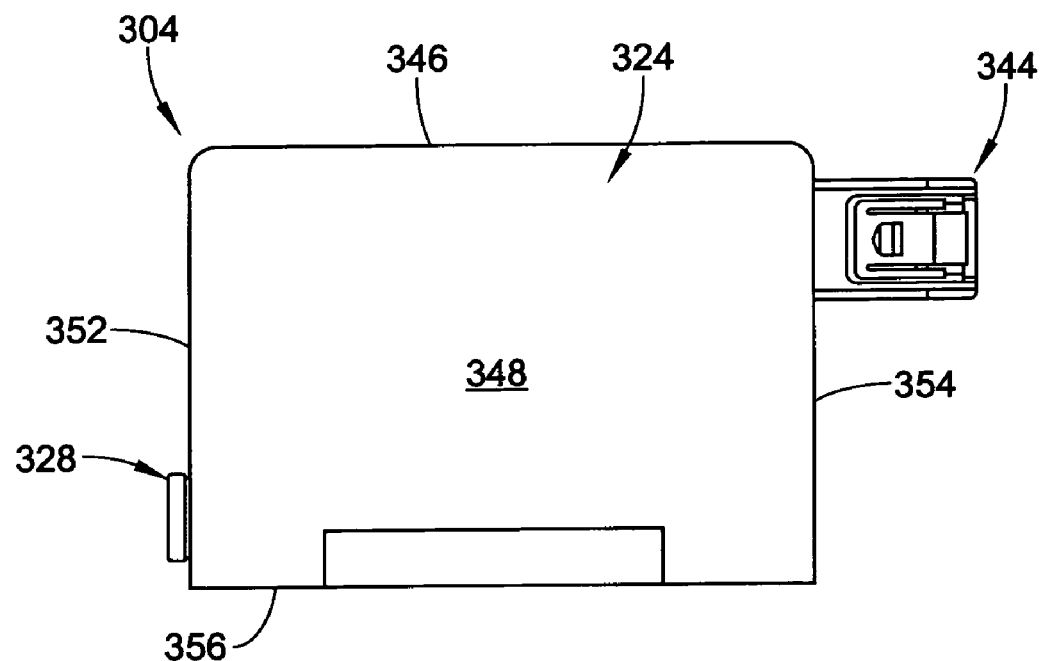
FIG. 15 is a front elevation view of the operating module in FIGS. 13 and 14.
Figure 16:
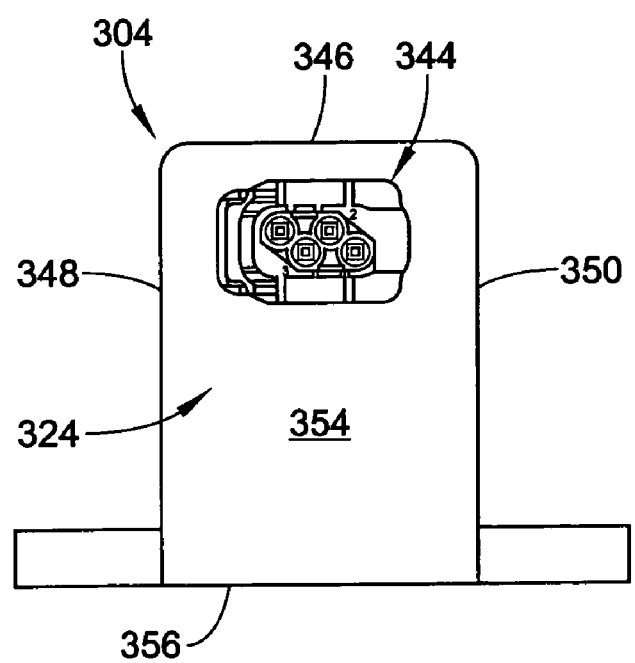
FIG. 16 is a right side view of the operating module in FIGS. 13-15.

As can be better seen in FIG. 12, operating module 304 includes a housing 324 and a valve 326 disposed within a valve chamber 327 that is at least partially formed within the housing. A connector fitting 328 is supported on housing 324 and is adapted to receive and form a fluid-tight connection with an associated fluid line (not shown). First end member 306 includes a first hole or opening 330 formed therethrough, and a fluid passage 332 extends through housing 324 from connector fitting 328 to valve 326 and exits the housing adjacent opening 330 in end member 306. Thus, fluid can be selectively delivered to and vented from spring chamber 312 by selectively actuating valve 326.

Operating module 304 is shown in FIG. 12 as including a sensor 334 in fluid communication with spring chamber 312, such as through fluid passage 332 and opening 330, for example. In the alternative, sensor 334 could be in fluid communication with spring chamber 312 through an additional passage (not numbered in FIG. 12) or through an entirely separate passage (not shown). Operating module 304 also includes a second sensor 336, such as a height sensor, for example. A second hole or opening 338 extends through first end member 306 and sensor 336 is disposed adjacent thereto. It will be appreciated that sensor 336 can be of any suitable type, kind or configuration, and can optionally utilize a secondary or distal component 340, such as a reflector or transponder, for example. Exemplary height sensors can include those adapted to broadcast ultrasonic or electromagnetic waves WVS, for example, as well as electromechanical sensors, such as linear position transducers (not shown) and mechanically-linked rotary potentiometers (not shown), for example. This embodiment of operating module 304 further includes an operating device 342 disposed within housing 324 and in electrical communication with valve 326 and sensors 334 and 336. Exemplary devices are discussed in greater detail as operating device 156 and combination device 250, as well as those discussed hereinafter. Additionally, operating module 304 includes a receptacle 344 extending from housing 324 and suitable for receiving a corresponding plug for connecting electrical leads, such as from a vehicle, local, or system network connection, for example. The terminals (not shown) of receptacle 344 are in electrical communication with operating device 342.

FIGS. 13-17 illustrate operating module 304 in greater detail. Housing 324 of operating module 304 includes a top wall 346, opposing side walls 348 and 350, opposing end walls 352 and 354, and a bottom wall 356. Housing 324 is shown herein as being substantially rectangular. However, it is to be appreciated that any suitable shape or configuration could alternately be used.

Figure 17:
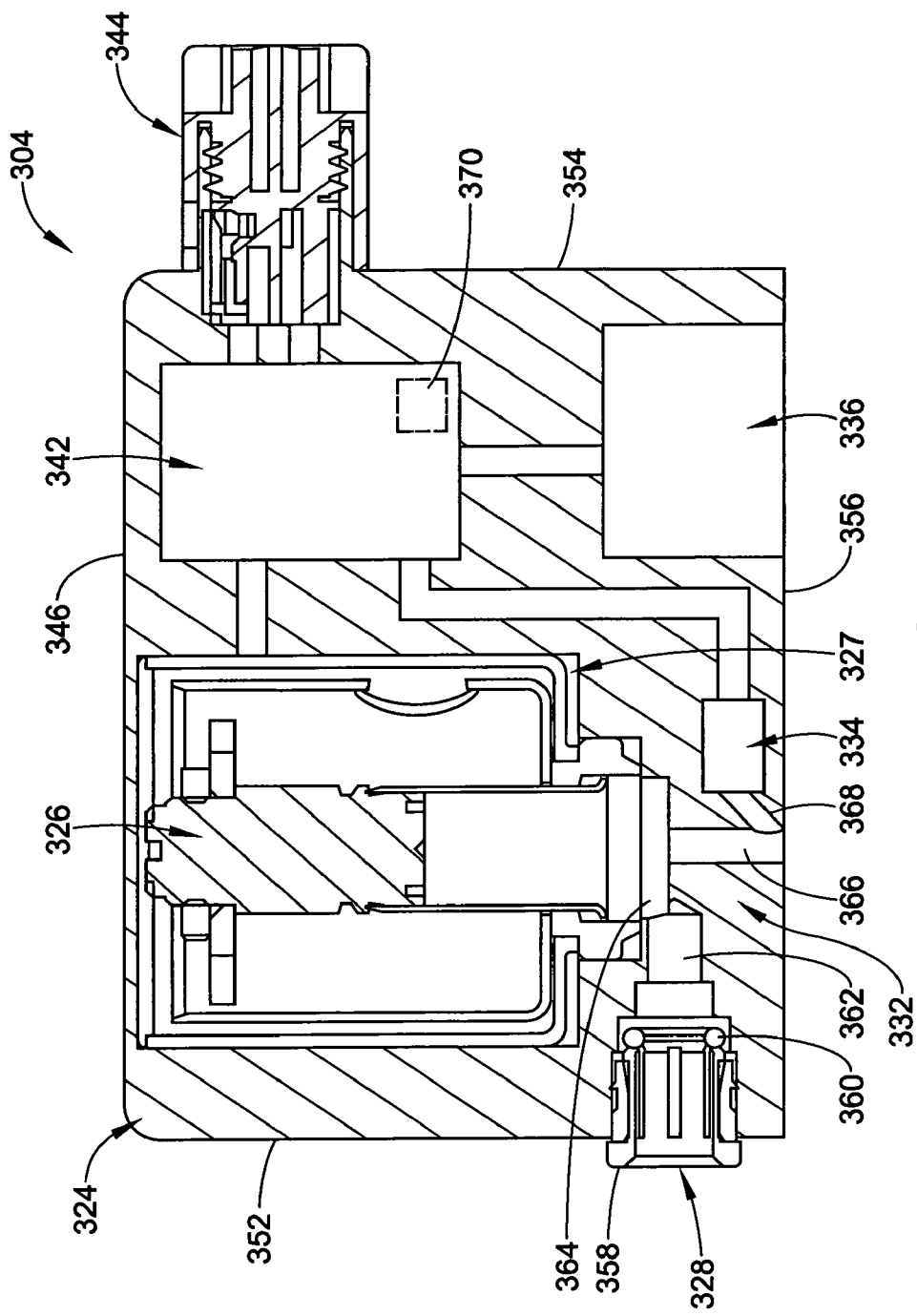
FIG. 17 is a front elevation view, in partial cross section, of the operating module in FIGS. 13-16 taken along line 17-17 in FIG. 14.
Figure 18:
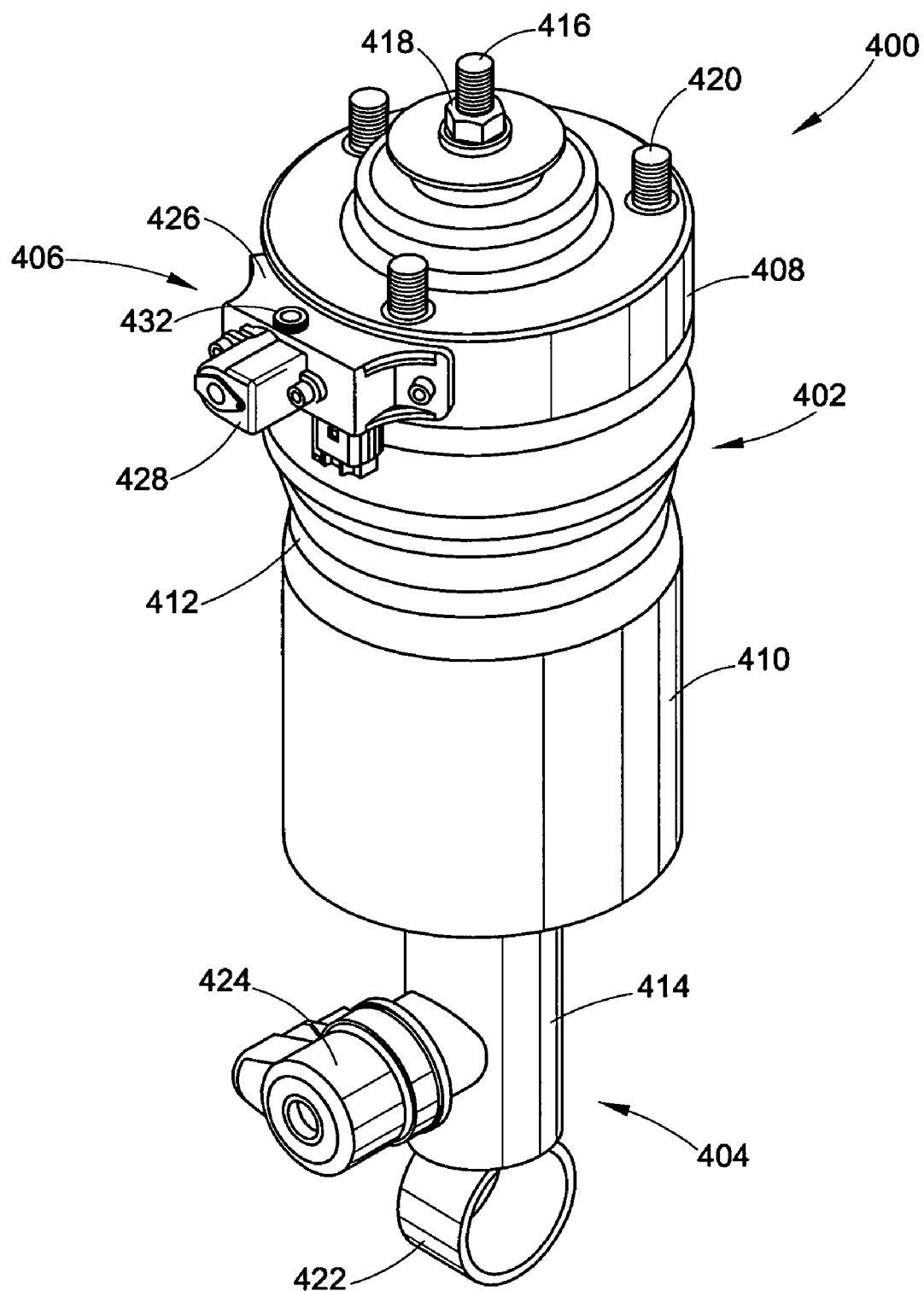
FIG. 18 is a perspective view of another exemplary embodiment of an air spring assembly in accordance with the present novel concept.
Figure 19:
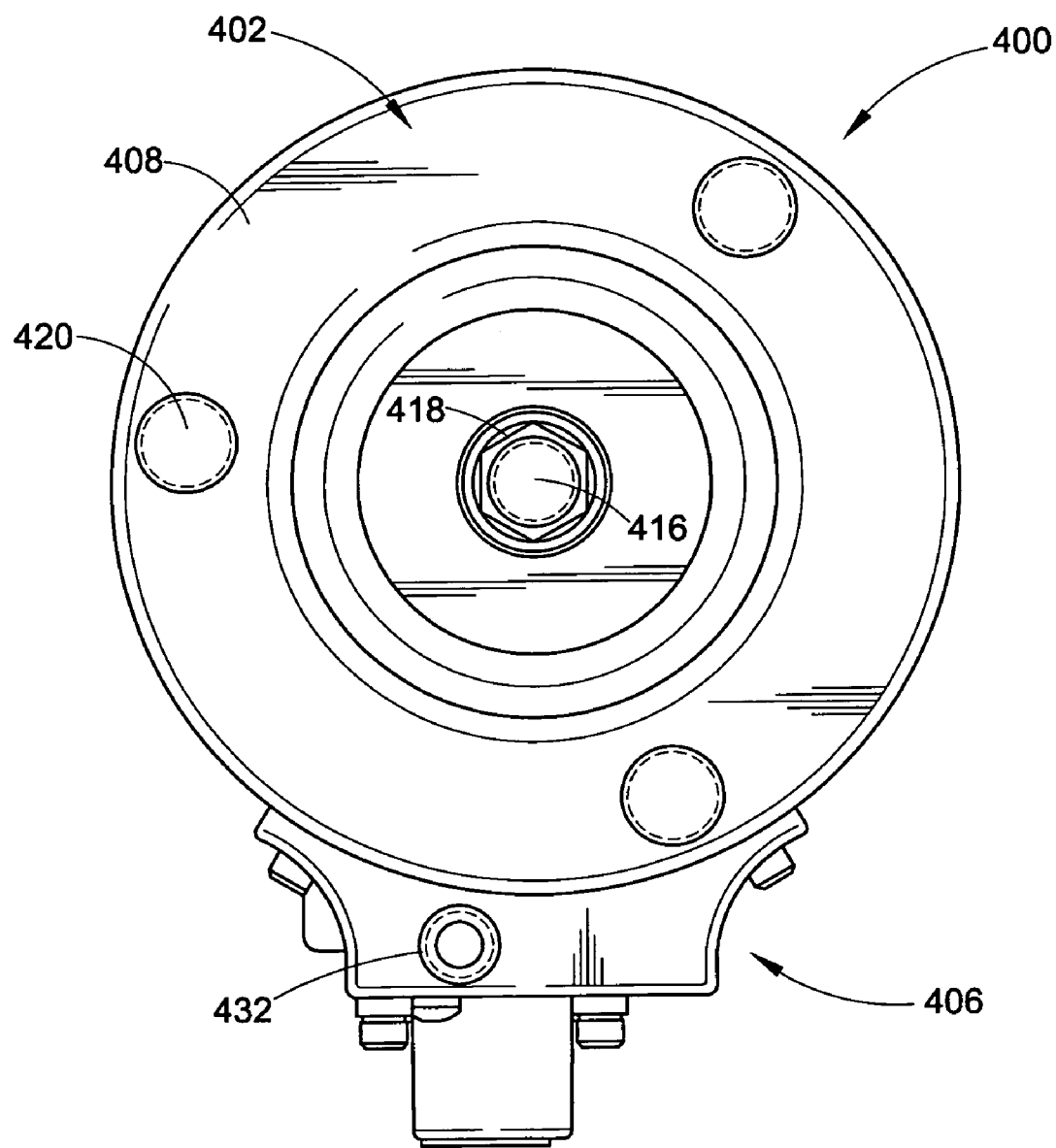
FIG. 19 is a top plan view of the air spring assembly in FIG. 18.
Figure 20:
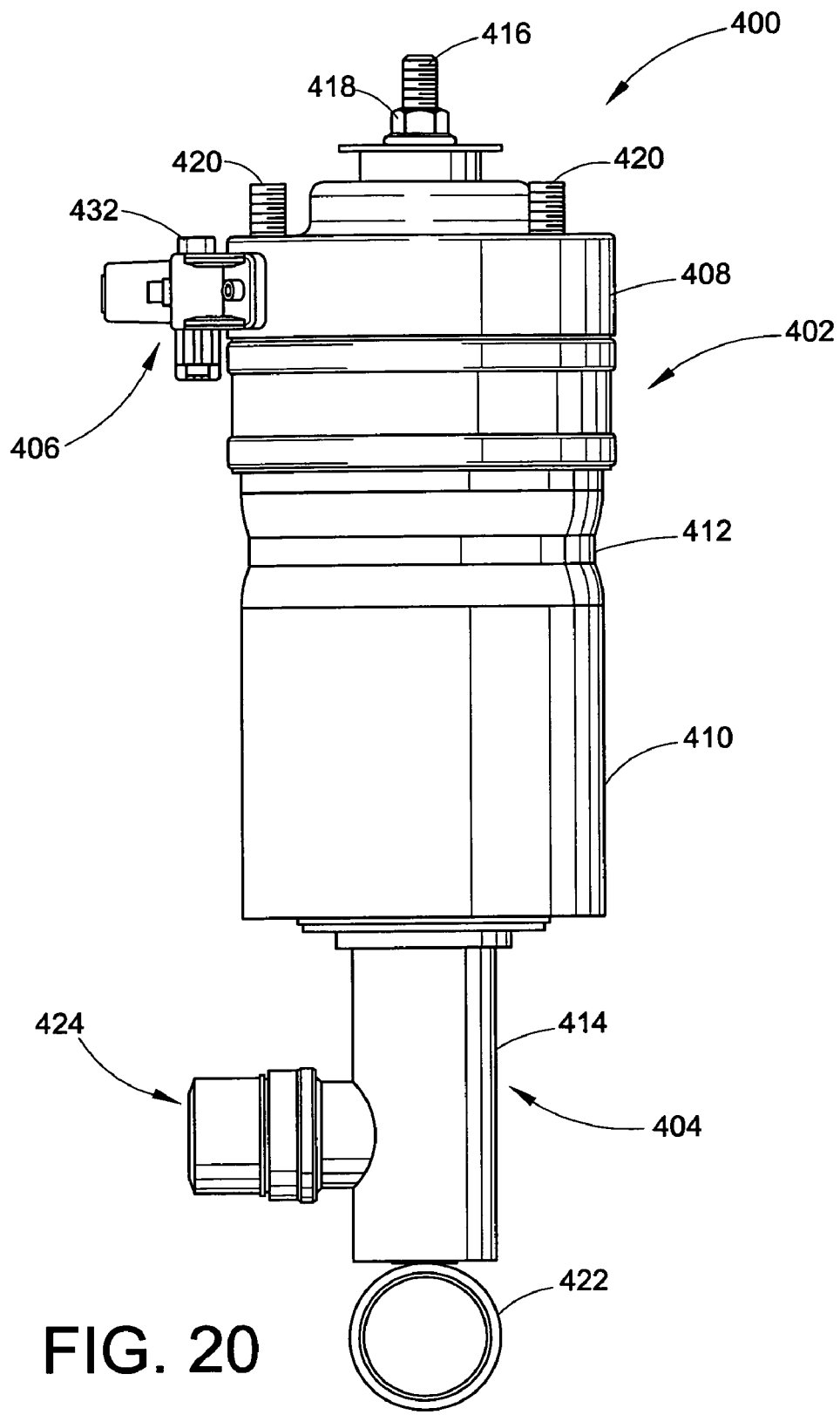
FIG. 20 is a right side view of the air spring assembly in FIGS. 18 and 19.
Figure 21:
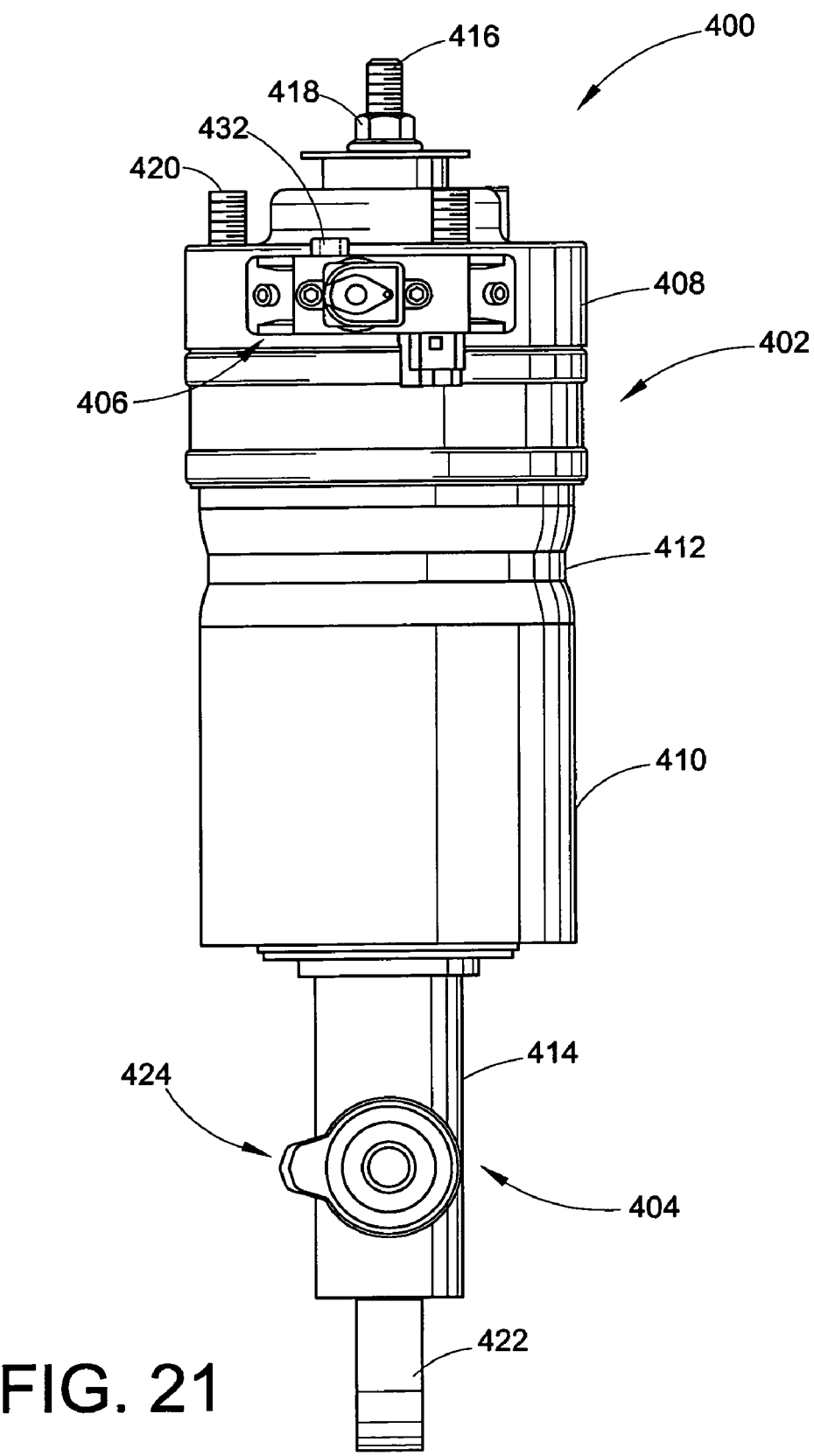
FIG. 21 is a front elevation view of the air spring assembly in FIGS. 18-20.

An enlarged cross sectional view of operating module 304 is shown in FIG. 17. As mentioned above, operating module 304 includes a connector fitting 328 which is shown as being a typical push-to-connect type fitting having a collet 358 and a sealing member 360. It will be appreciated, however, that any suitable type, kind or configuration of connector could alternately be used. Fluid passage 332 can take any suitable form or configuration, and is shown in the exemplary embodiment as including a plurality of interconnected passages, including a fitting passage 362, a valve passage 364 and an end passage 366 opening along bottom wall 356 and in communication with the spring chamber through first opening 330 in first end wall 306. As indicated above, sensor 334 is a pressure sensor or transducer in fluid communication with spring chamber 312 through a sensor passage 368 disposed along end passage 366. Additionally, a sensor 370 can be included on operating device 342, either as a separate discrete component or as an integral device. One example of a suitable sensor is an accelerometer, such as a single or multi-axis accelerometer, for example.

Another exemplary embodiment of an air spring assembly in accordance with the present novel concept is shown in FIGS. 18-21 as air spring assembly 400 and includes an air spring 402 supported on a damping member 404. Air spring assembly 400 also includes an operating module 406 secured along and in operative communication with air spring 402. The air spring includes a first end member 408, an opposing second end member 410 spaced from the first end member and a flexible wall 412 secured therebetween and at least partially defining a spring chamber (not shown) therein. Damping member 404 includes a first damper portion or housing 414 and a second damper portion or damping rod 416 extending from housing 414 and reciprocally interengaging the same. First end member 408 is secured along a threaded end of damping rod 416 using a suitable fastener, such as a nut 418, for example. The first end member includes mounting studs 420 projecting therefrom that are suitable for attaching the first end member to a structural member of the vehicle. A mounting ring 422 or other suitable feature is disposed along the opposing end of housing 414 for securing the same along a wheel-engaging member of the vehicle.

Additionally, damping member 404 can optionally include a suitable arrangement for the varying damping rate thereof. For example, the damping member could be a magnetorheological-type or electrorheological-type adjustable damping member. Alternately, as shown in FIGS. 18-21, for example, damping member 404 could include a valve or other mechanical arrangement for varying the damping rate of the damping member. In the exemplary embodiment shown, housing 414 includes a valve 424 suitable for varying the damping rate of the damping member. In one exemplary embodiment, valve 424 is electrically actuatable and can receive electrical signals to selectively produce the varied damping rates. The electrical signals can be provided by any suitable system or network, such as from an active damping system, an active roll control system or a stability control system, for example. Alternately, valve 424 can be in electrical communication with operating module 406 in a suitable manner, such as by using wired or wireless signal transmission, for example, and signals regarding the selective variation of the damping rate can be communicated to valve 424 through the operating module.

Operating module 406 includes a housing 426 that supports a valve assembly 428, a signal processing device (not shown), one or more sensors (not shown) and an electrical connector 430, such as a plug or receptacle, for example. Operating module 406 also includes a connector fitting 432 for receiving and securing a fluid line on the operating module in a substantially fluid-tight manner. The housing also includes a fluid passage (not shown) extending from the connector fitting to valve assembly 428 and into the spring chamber of the air spring in a suitable manner, such as has been discussed with regard to operating module 304 and air spring 302, for example. Additionally, one or more sealing member or gaskets or even a quantity of sealant can be disposed between operating module 406 and first end member 408 to ensure a fluid-tight seal formed therebetween.

Figure 22:
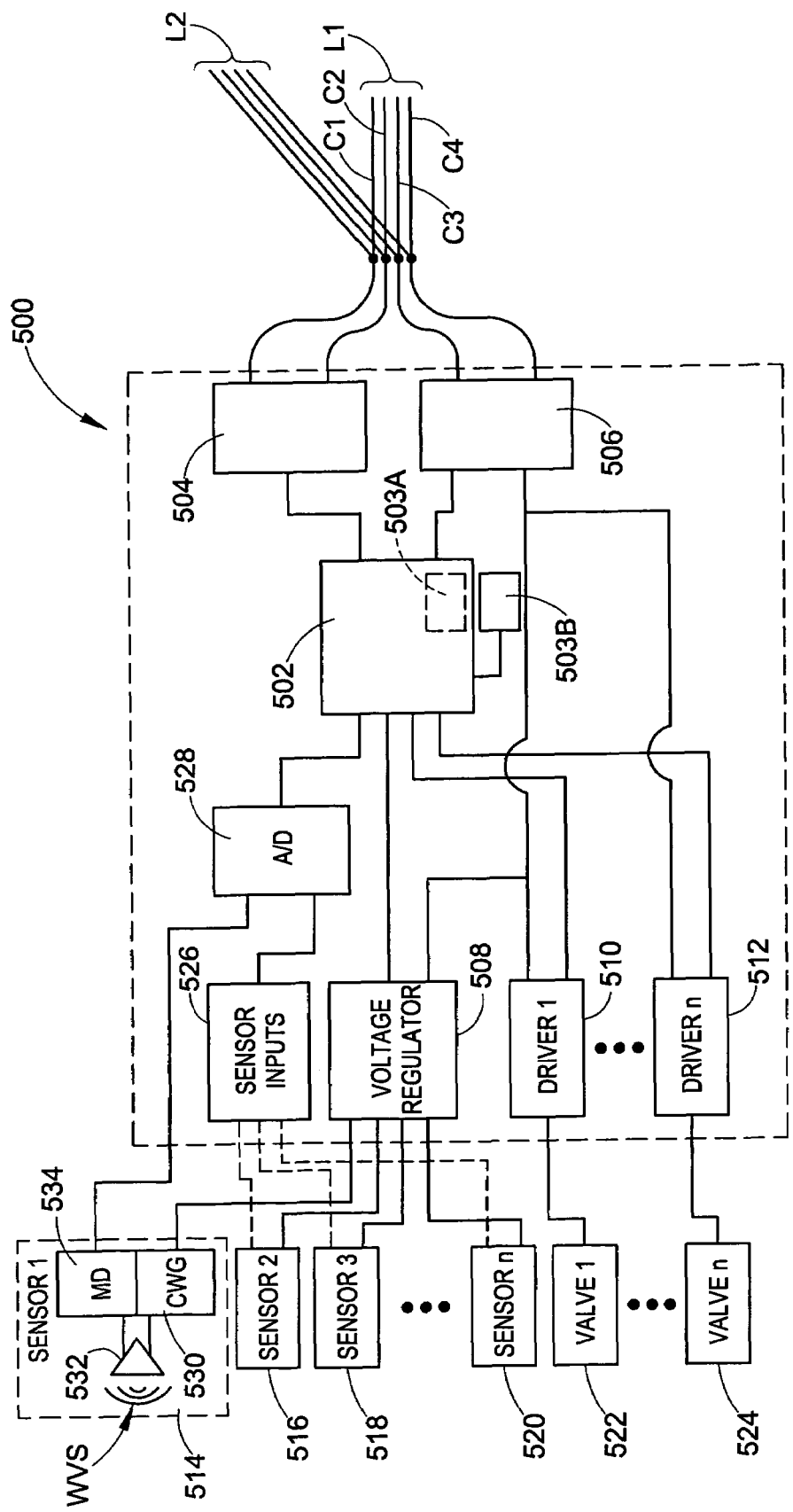
FIG. 22 schematically illustrates another exemplary embodiment of a communication system for an air spring assembly in accordance with the present novel concept.

A further exemplary embodiment of an operating device in accordance with the present novel concept is schematically illustrated in FIG. 22 as an operating device 500. This embodiment of an operating device, such as device 500, for example, includes a signal processing device 502, an optional memory 503A and/or 503B, a signal or communication interface 504 electrically connected to the signal processing device, and a power connection interface 506 in electrical communication with the signal processing device. Power connection interface 506 is also in electrical communication with a voltage regulator 508 and one or more driver circuits, indicated generally by reference names "Driver 1" to "Driver n". In the present exemplary embodiment, the one or more driver circuits include driver circuits 510 and 512. Signal processing device 502 is also in electrical communication with the voltage regulator and driver circuits. Four-conductor (C1, C2, C3 and C4) leads L1 and L2, such as may be associated with a vehicle, local or system network, for example, are electrically connected to operating device 500. In the exemplary embodiment shown, conductors C1 and C2 carry data, instructions and/or other communication signals and are electrically connected with signal or communication interface 504. Conductors C3 and C4 are power and ground conductors, respectively, and are electrically connected to power connection interface 506.

Operating device 500 is operatively associated with a plurality of sensors, indicated generally by reference names "Sensor 1" to "Sensor n", that can be of any suitable type, kind, configuration or combination thereof. The plurality of sensors include sensors 514, 516, 518 and 520, and voltage regulator 508 is shown as being in electrical communication with sensors 514-520 and outputs conditioned electrical power thereto. It will be appreciated, however, that in this or other exemplary operating devices (e.g., operating device 156 and combination device 250), some sensors may not utilize an external power source and, thus, may not be in communication with the voltage regulator. One example of such a sensor is an accelerometer. Operating device 500 is also operatively associated with one or more valves, indicated generally by reference names "Valve 1" to "Valve n", that can be of any suitable type, kind, configuration or combination thereof. In the present exemplary embodiment, the one or more valves include valves 522 and 524. The one or more valves are operatively associated with the one or more driver circuits, discussed above. As such, valves 522 and 524 are shown herein as being in respective electrical communication with driver circuits 510 and 512, which are operative to selectively energizing the same. Additionally, it will be appreciated that valves 1 to n, such as valves 522 and 524, for example, can be operatively associated with any vehicle devices or components, such as for providing flow control along multiple fluid flow paths to/from one or more components, along different portions of one fluid flow path to/from one or more components, such as an air spring or damper, for example, or providing flow control along flow paths to/from different components, such as one valve operatively associated with an air spring and one valve operatively associated with a damper, for example. More specifically, a valve, such as valve 522 or 524, could optionally be used to introduce an additional volume into fluid communication with a spring chamber to alter the spring rate of the fluid spring. Or, a valve, such as valve 522 or 524 could be used to permit cross flow between front and/or rear fluid springs of a vehicle, for example.

One or more of the plurality of sensors are shown as being in communication with sensor input interface 526, which receives the signals output by the sensors indicative of inputs or conditions being measured, determined or otherwise sensed by the sensors. In the exemplary embodiment shown, sensors 516, 518 and 520 are in electrical communication with sensor input interface 526, which communicates these sensor signals to an analog-to-digital converter 528 which, in turn, communicates data corresponding the sensor signals to signal processing device 502. Sensor 514, however, is not shown as being in electrical communication with input interface 526. Rather, sensor 514 communicates directly with analog-to-digital converter 528.

In the exemplary embodiment shown in FIG. 22, sensor 514 can be a height or distance determining sensor that is adapted to output waves WVS, such as is shown in FIG. 12, for example, which can be of any suitable type or kind, such as air pressure waves (e.g. sonic or ultrasonic), for example. In such case, a suitable reflector or other component or object can optionally be used, such as distal component 340 in FIG. 12, for example.

Alternately, sensor 514 can be a height or distance determining sensor that is adapted to output electromagnetic waves WVS (e.g. 100 kHz to 30 MHz) and utilize inductive coupling with a second sensor device or component, indicated generally as distal component 340 in FIG. 12, for example, to determine the distance DST (FIG. 12) therebetween. In such an exemplary embodiment, sensor 514 could include a carrier wave generator 530 adapted to output a suitable carrier wave and an antenna 532 in electrical communication with carrier wave generator 530. The antenna receives a suitable carrier wave from generator 530 and broadcasts a corresponding electromagnetic wave WVS toward a corresponding second sensor device that is inductively coupled to sensor 514. The second sensor device is operative to modulate the electromagnetic wave in a manner corresponding to the distance between the second sensor device and sensor 514. Sensor 514 includes a modulation detector 534 that is in electrical communication with analog-to-digital converter 528. The modulation detector detects the modulation and outputs a signal having a relation to distance to the analog-to-digital converter which, in turn, outputs data corresponding to the signal from modulation detector 534 to signal processing device 502.

Figure 23:
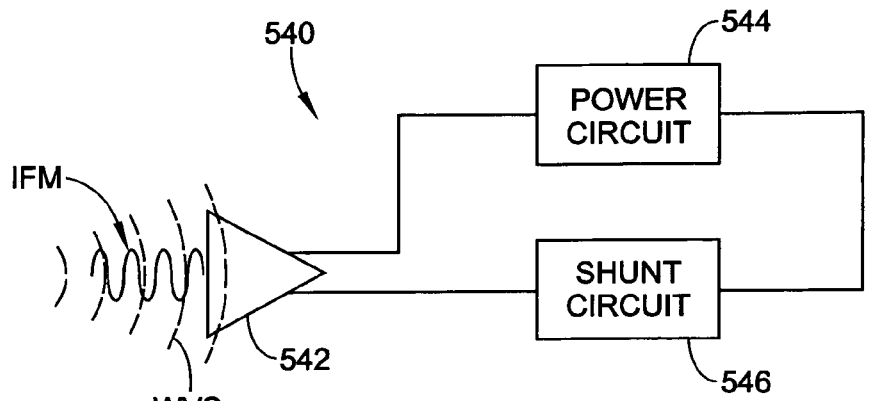
FIG. 23 schematically illustrates one exemplary embodiment of a transponder operable with the communication system in FIG. 22.

One example of a suitable second sensor device is shown in FIG. 23 as a transponder 540 that includes an antenna 542, a power circuit 544 electrical connected to antenna 542, and a shunt circuit 546 electrically connected between power circuit 544 and antenna 542. Antenna 542 receives electromagnetic waves WVS broadcast by antenna 532 of sensor 514, which induces an electrical power output that is transmitted to power circuit 544. The power circuit accumulates the electrical power output and transmits an electrical energy pulse to shunt circuit 546 once a predetermined quantity of electrical energy has accumulated within the power circuit. The electrical energy pulse causes shunt circuit 546 to form an electrical short circuit across antenna 542.

Antenna 532 and antenna 542 preferably include complimentary inductive elements (not shown). The electromagnetic wave received along antenna 542 induces an electric signal across or along the inductive element of the antenna. This electrical signal is communicated to the power circuit, as explained above. As the power circuit selectively energizes the shunt circuit, a short across the inductive element of antenna 542 occurs. This short reduces the inductance of the inductive element of antenna 542 to about zero. One of skill in the art will recognize that the inductive elements of antennae 532 and 542 act as a loosely coupled transformer and that the change in inductance of the inductive element of antenna 542 creates an induced field modulation, shown generally as sine waves IFM in FIG. 23, that will cause a corresponding change in the inductive element of antenna 532. The change in the inductive element of antenna 532 is related to the distance between the first and second sensor devices, and can thus be used to determine the distance therebetween. This change is detected by modulation detector 534 and a signal corresponding to the modulation is communicated to analog-to-digital converter 528, as discussed above.

Figure 24:
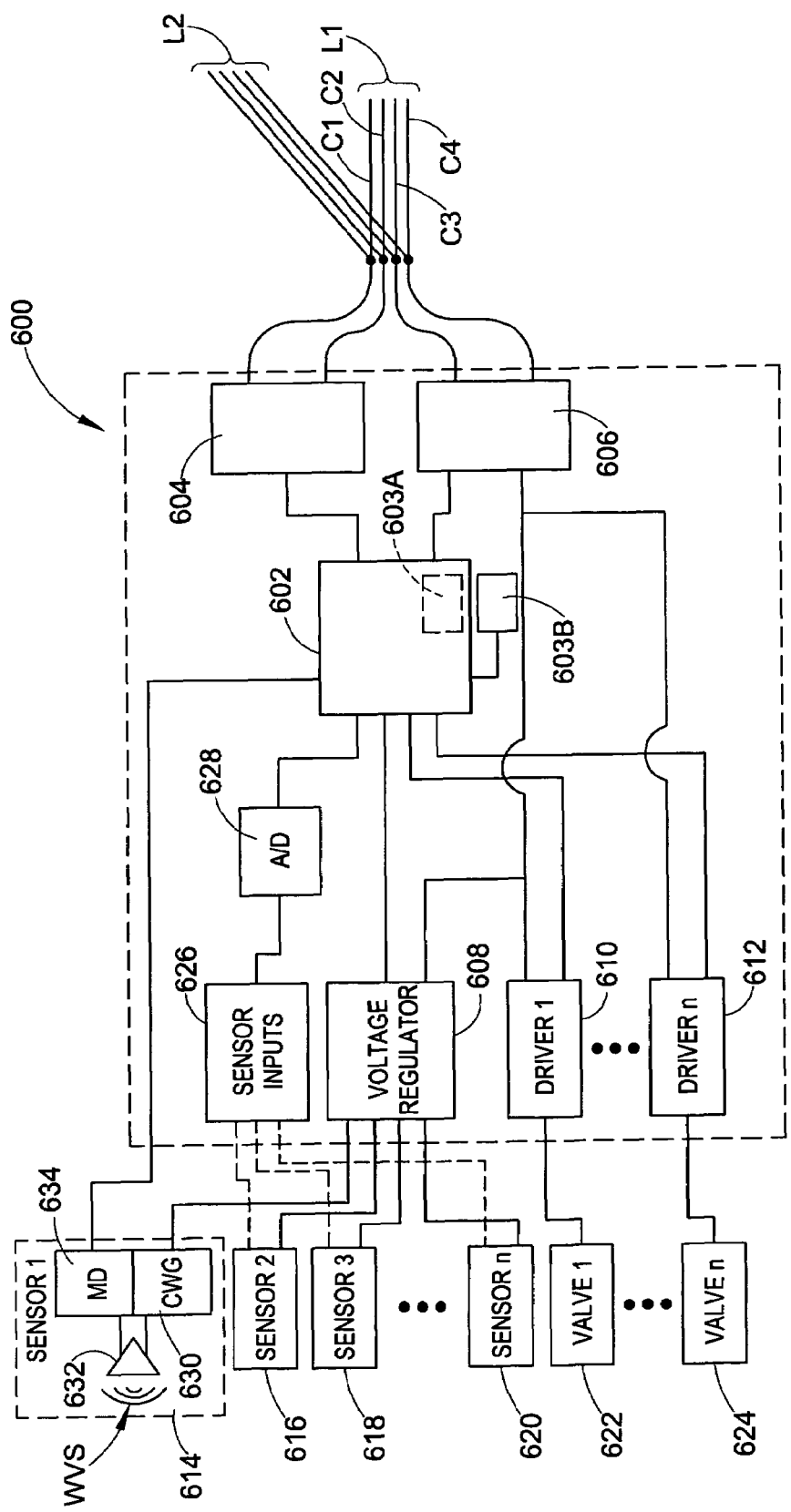
FIG. 24 schematically illustrates a further exemplary embodiment of a communication system for an air spring assembly in accordance with the present novel concept.

Still a further exemplary embodiment of an operating device in accordance with the present novel concept is schematically illustrated in FIG. 24 as an operating device 600. It will be appreciated that operating device 600 is substantially identical to operating device 500 shown in and discussed with regard to FIG. 22. As such, like items are indicated with like item numbers incremented by 100. Thus, a signal processing device represented in FIG. 22 by item number 502 will be indicated by item number 602 in FIG. 24. Differences between operating devices 500 and 600 will be distinctly pointed out and discussed where appropriate.

Turning now to operating device 600, sensor 614 therein is substantially similar to sensor 514 discuss above in detail. However, sensor 614 is shown as being in direct electrical communication with signal processing device 602, whereas sensor 514 is in communication with the analog-to-digital converter. Thus, modulation detector 534 outputs an analog signal corresponding to the modulation, whereas modulation detector 634 outputs digital data corresponding to the modulation.

Figure 25:
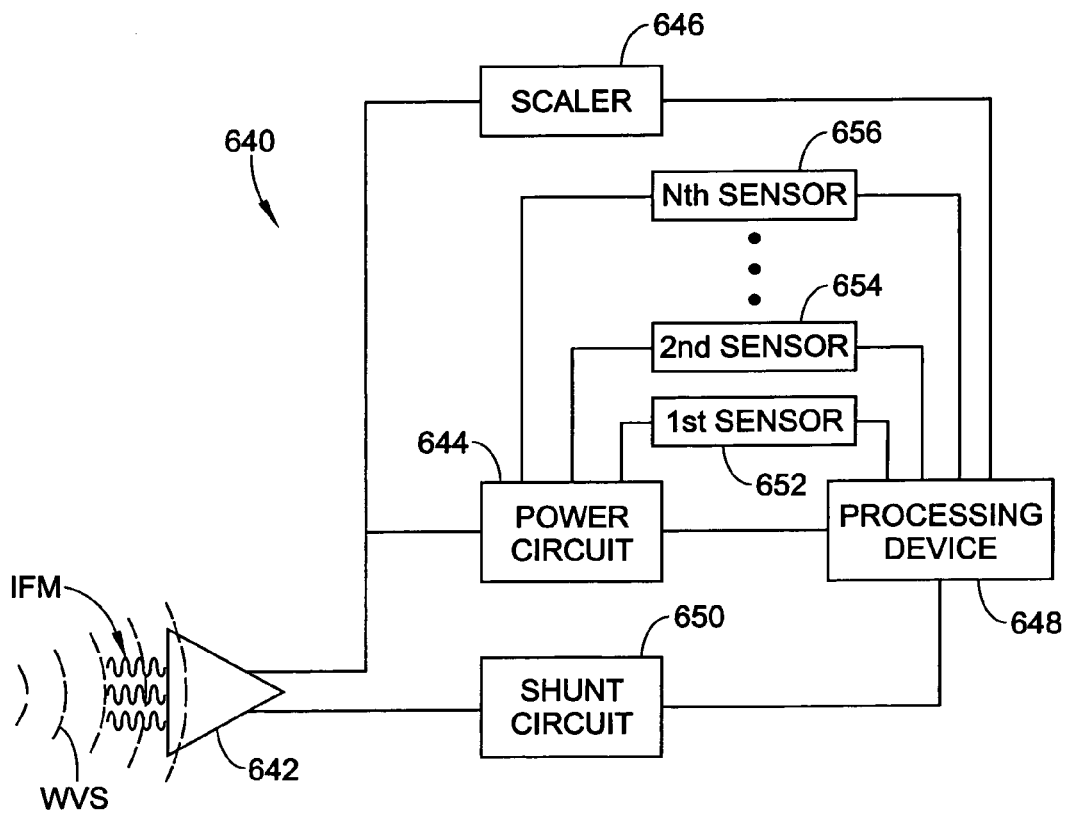
FIG. 25 schematically illustrates an exemplary embodiment of a transponder operable with the communication system in FIG. 24.

One exemplary embodiment of a second sensor device 640 is that is operable with sensor 614 of operating device 600 is shown in FIG. 25. Second sensor device 640 includes an antenna 642 inductively coupled with antenna 632 of sensor 614, in a manner substantially similar to that discussed above with regard to antennae 532 and 542. Antenna 642 receives electromagnetic waves WVS and an electrical signal is generated along and/or across an inductive element (not shown). Second sensor device 640 includes a power circuit 644 and a scaler 646, each electrically connected to antenna 642. Power circuit 644 is operative to collect electrical energy from antenna 642, as discussed above. Second sensor device 640 also includes a processing device 648, such as a microprocessor, microcontroller or microcomputer, for example. Processing device 648 is electrically connected to power circuit 644 and receives electrical power therefrom. Scaler 646 is electrically connected to processing device 648, and is operative to appropriately scale the magnitude of the electrical signal received from antenna 642 to a level suitable for receipt by processing device 648. The scaled signal from scaler 646 is received by processing device 648 which determines the distance between sensor 614 and second sensor device 640. Thus, the determination of the distance occurs at the second sensor device rather than at the first sensor device which is more directly operatively associated with the operating device.

Second sensor device 640 further includes a shunt circuit 650 electrically connected between the processing device and the antenna. Shunt circuit is operative to short the inductive element of the antenna and induce a modulation in the antenna of the sensor, as generally indicated by sine waves IFM. Rather than operating merely to cause a modulation of the corresponding antenna, as in sensor 514 and second sensor device 540, second sensor device 640 is operative to communicate data corresponding to or otherwise associated with the distance determined by the processing device to sensor 614 for communication to processing device 602. The data can be communicated in any suitable form and/or manner. For example, processing device 648 can selectively energize shunt circuit 650 to communicate signals corresponding to binary data, such as by direct communication in which a modulation corresponds to a zero (0) value and an non-modulation corresponds to a one (1) value. Alternately, an encoded communication scheme could be used, such as phase shift keying or frequency shift keying, as is well understood by those of skill in the art. Modulation detector 634 detects the data communicated from device 640 and communicates the data to signal processing device 602. Modulation detector 634 can also decode the data signals, if an encoding scheme is used.

Additionally, second sensor device 640 is shown in FIG. 25 as including one or more optional sensors, indicated generally by reference characters "1$^{st}$ Sensor" to "N$^{th}$ Sensor." Thus, it will be appreciated that such sensors are optional and can be of any suitable type, kind, quantity and/or configuration. In the exemplary embodiment shown, sensors 652, 654 and 656 are electrically connected between power circuit 644 and processing device 648. Thus, the sensors receive electrical power from power circuit 644 and output a corresponding sensor signal to processing device 648. The processing device can then communicated any provided sensor data to modulation detector 634 along with the distance data as discussed above. Examples of suitable sensors can include accelerometers, pressure sensors or transducers and/or temperature sensors or thermocouples.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. For example, the operating module could include a housing to which discrete components are individually mounted. In still another example, one or more of the components could be separately mounted, such as on an end member of an air spring, for example. Additionally, other devices and/or components than the sensors and valves discussed could be in operative association with the operating module. Such other devices and/or components could include an output device, such as a lamp, for example. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. An operating module for use on an associated air spring at an associated corner of an associated vehicle having an associated suspension controller and adapted to receive commands from the associated suspension controller, the associated air spring undergoing a first associated input condition and including an associated end member having an associated opening therethrough, said operating module comprising:
    a housing including a fluid passage extending therethrough, said housing adapted for securement on the associated end member such that said fluid passage is in communication with the associated opening thereof;
    at least one of:
        a valve assembly supported on said housing along said fluid passage and selectively operable between an open passage condition and a closed passage condition; or,
        a first sensor supported on said housing and outputting a signal indicative of the first associated input condition; and,
    a processing device supported on said housing and in electrical communication with the associated suspension controller and at least one of said valve assembly or said first sensor, said processing device operative to convert, translate, encrypt, decrypt, encode and/or decode commands received from the associated suspension controller and execute said commands to adjust the associated air spring.

2. An operating module according to claim 1, wherein said valve assembly includes a valve body supported on said housing along said fluid passage and an actuator in operative association with said valve body, said actuator operative to displace said valve body between an open passage condition and a closed passage condition.

3. An operating module according to claim 1, wherein said first sensor is one of an accelerometer, a pressure sensor, a temperature sensor and a distance sensor.

4. An operating module according to claim 1 further comprising a second sensor in communication with said processing device and outputting a signal indicative of a second associated input.

5. An operating module according to claim 1 further comprising an operating device supported on said housing and in communication with said valve assembly and said first sensor, said operating device including said processing device.

6. An operating module according to claim 5, wherein said operating device includes at least one of a power connection interface or a communication interface in communication with said processing device.

7. An operating module according to claim 5, wherein said operating device includes a driver circuit in electrical communication with said processing device and said valve assembly.

8. An operating module according to claim 5, wherein said operating device includes a voltage regulator in electrical communication with said processing device and said first sensor.

9. An operating module according to claim 5, wherein said operating device includes a sensor input interface in electrical communication with said first sensor.

10. An operating module according to claim 9, wherein said operating device includes an analog-to-digital converter in electrical communication between said sensor input interface and said processing device.

11. An air spring assembly for use on an associated vehicle that includes an associated supervisory suspension controller adapted to output an associated control instruction, said air spring assembly comprising:
 a first end member having a first opening extending therethrough;
 a second end member spaced from said first end member;
 a flexible wall secured between said first and second end members and at least partially defining a spring chamber therebetween;
 a valve assembly supported on said first end member in communication with said spring chamber through said first opening;
 a sensor supported on said first end member or said second end member and adapted to output a sensor signal; and,
 a signal processing device supported on said first end member in electrical communication with the supervisory suspension controller, said valve assembly and said sensor, said signal processing device operative to:
 receive an associated control instruction;
 convert the associated control instruction into a control signal; and,
 communicate said control signal to said valve assembly to cause the execution of the associated control instruction.

12. An air spring assembly according to claim 11 further comprising a housing supported on said first end member and including a housing wall and a fluid passage extending through said housing wall.

13. An air spring assembly according to claim 12, wherein said housing is positioned on said first end member such that said fluid passage is in communication with said first opening.

14. An air spring assembly according to claim 12, wherein said valve assembly includes a valve body supported on said housing along said fluid passage and an actuator in operative association with said valve body, said actuator operative to displace said valve body between an open passage condition and a closed passage condition.

15. An air spring assembly according to claim 14, wherein said housing includes a valve chamber disposed along said fluid passage and said valve body is at least partially received within said valve chamber.

16. An air spring assembly according to claim 11, wherein said sensor is a first sensor and said air spring assembly includes a second sensor in communication with said signal processing device.

17. An air spring assembly according to claim 16, wherein at least one of said first sensor or said second sensor is one of an accelerometer, a pressure sensor, a temperature sensor and a distance sensor.

18. An air spring assembly according to claim 11 further comprising an operating device supported on said first end member and in communication with said valve assembly and said sensor, said operating device including said signal processing device and a memory in communication with said signal processing device.

19. An air spring assembly according to claim 18, wherein said operating device includes a memory in operative association with said signal processing device.

20. An air spring assembly according to claim 17, wherein said first sensor is a distance sensor broadcasting one of ultrasonic waves and electromagnetic waves.

21. A vehicle suspension system comprising:
 an air spring assembly according to claim 11; and,
 a supervisory suspension controller operable to make decisions regarding the operation and performance of said air spring assembly and to communicate corresponding control instructions to said air spring assembly;
 said signal processing device of said air spring assembly operative to communicate said sensor signal to said supervisory suspension controller and receive said control instructions from said supervisory suspension controller, said control instructions including a valve actuation signal for actuating said valve assembly.

22. A method of operating a vehicle suspension system comprising:
 a) providing a vehicle suspension system including a supervisory suspension controller, an air spring assembly including an air spring, a sensor and a signal processing device, and a communication network extending between said supervisory suspension controller and said signal processing device;
 b) generating a sensor output signal using said sensor and communicating said sensor output signal to said signal processing device;
 c) generating a first communication signal corresponding to said sensor output signal using said signal processing device;
 d) communicating said first communication signal to said supervisory suspension controller;
 e) processing said first communication signal using said supervisory suspension controller;
 f) making a determination having a relation to said vehicle suspension system based at least partially upon said first communication signal using said supervisory suspension controller and generating a control instruction corresponding to said determination using said supervisory suspension controller;
 g) communicating said control instruction to said signal processing device;

h) converting said control instruction into a control signal using said signal processing device; and, i) communicating said control signal to said valve assembly to cause the execution of said control instruction.

23. A method according to claim 22, wherein a) includes providing a valve assembly supported along said air spring assembly and in operative communication with said signal processing device, and said method further comprises generating a valve actuation signal corresponding to said second communication signal and communicating said valve actuation signal to said valve assembly for actuation thereof.

* * * * *

UNITED STATES PATENT AND TRADEMARK OFFICE
CERTIFICATE OF CORRECTION

PATENT NO.       : 7,621,538 B2                                                         Page 1 of 1
APPLICATION NO.  : 11/442210
DATED            : November 24, 2009
INVENTOR(S)      : Nordmeyer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 719 days.

Signed and Sealed this

Twenty-sixth Day of October, 2010

David J. Kappos
*Director of the United States Patent and Trademark Office*